US012627132B2

(12) United States Patent
Dunham

(10) Patent No.: US 12,627,132 B2
(45) Date of Patent: May 12, 2026

(54) PROTECTIVE UTILITY WILDLIFE GUARD

(71) Applicant: Sean Dunham, Lake Elmo, MN (US)

(72) Inventor: Sean Dunham, Lake Elmo, MN (US)

( * ) Notice: Subject to any disclaimer, the term of this patent is extended or adjusted under 35 U.S.C. 154(b) by 246 days.

(21) Appl. No.: 18/205,811

(22) Filed: Jun. 5, 2023

(65) Prior Publication Data

US 2023/0396051 A1      Dec. 7, 2023

Related U.S. Application Data

(60) Provisional application No. 63/348,747, filed on Jun. 3, 2022.

(51) Int. Cl.
| | |
|---|---|
| *H02G 15/16* | (2006.01) |
| *A01M 29/30* | (2011.01) |
| *H01B 17/56* | (2006.01) |
| *H02G 7/00* | (2006.01) |

(52) U.S. Cl.
CPC ............ *H02G 15/16* (2013.01); *A01M 29/30* (2013.01)

(58) Field of Classification Search
CPC ................................ H01B 17/00; H01B 17/56
See application file for complete search history.

(56) References Cited

U.S. PATENT DOCUMENTS

| | | | | |
|---|---|---|---|---|
| 7,834,269 B2 * | 11/2010 | Niles | ......................... | H02G 7/00 174/84 R |
| 2014/0262434 A1 * | 9/2014 | Stransky | .................. | H02G 7/00 29/887 |

* cited by examiner

*Primary Examiner* — Timothy J Thompson
*Assistant Examiner* — Amol H Patel
(74) *Attorney, Agent, or Firm* — Pauly, DeVries Smith & Deffner LLC

(57) ABSTRACT

A protective cover for a multi-connector power distribution device, the protective cover comprising: at least two substantially concave coverage lobes, each of the coverage lobes corresponding to a connector on the multi-connector power distribution device.

19 Claims, 27 Drawing Sheets

PROTECTIVE UTILITY WILDLIFE GUARD

This application claims the benefit of U.S. Provisional Application No. 63/348,747 filed Jun. 3, 2022, the content of which is herein incorporated by reference in its entirety.

FIELD

The present invention relates to a wildlife guard for electrical power equipment and electrical power equipment mounting devices. More particularly, it relates to a wildlife guard for preventing animals perching on top of the guard from making contact with the metal bracket underneath it.

BACKGROUND

Animal caused electric power outages are one of the leading causes of electrical outages in North America. Equipment used to supply electrical power often use fiberglass standoff brackets to provide distance between the utility pole and the live electrical equipment. That space provides the first protection to prevent stray electrical current from jumping to the pole. In addition, the fiberglass arm itself is a non-conductive material that prevents current transfer to the pole. This distance allows the electrical equipment to operate safely without the potential of a phase-to-ground fault, stray voltage, or other undesirable electrical event to take place. When these events take place they can cause sparks leading to fires or power outages related to homes and business being without electrical service. The fiberglass standoff bracket is typically applied where an electrical power service transitions from the overhead feed to an underground feed, or vice versa.

If an animal is to perch on the bracket, the guard allows the animal to perch without coming in contact with any metal surfaces of the bracket underneath. The bracket underneath is what can become energized acting like the path to ground for electricity to travel through.

Therefore, a need exists for an improved way to prevent animals from perching on utility brackets in a manner that creates a short or other undesirable electrical event.

SUMMARY

The present application provides protection against potential animal deaths and power outages. In an embodiment, the present disclosure is directed to a protective cover for a multi-connector power distribution device (such as a bracket). The protective cover is includes at least two substantially coverage lobes, each of the coverage lobes corresponding to a connector on the multi-connector power distribution device that is covered by the coverage lobes to prevent contact by an animal (such as a squirrel).

In an embodiment, the protective cover includes at least three coverage lobes.

In an embodiment, the protective cover is electrically non-conductive.

In an embodiment, the lobes further include a relief cut allowing for flexing of the lobes during installation.

In an embodiment, the lobes further include a snap clip for securing to the power distribution device.

In an embodiment, the protective cover can further include two snap clips on opposed sides of the protective cover.

In an embodiment, the protective cover further includes an internal stop retaining the protective cover at a defined height above the power distribution device.

In an embodiment, the concave coverage lobes are rounded.

In an embodiment, the protective cover further can include interior shields restricting insect entry into central portions of the multi-connector power distribution device.

In an embodiment, the interior shields isolate the central portions of the multi-connector power distribution device from the exterior, such as to prevent entry of small animals (insects, birds, etc.).

In an embodiment, when installed the protective cover has a gap near outer lobes that allows for a conductor to extend out from under the protective cover without reducing the protection features. In an embodiment, when installed, the gap is at least 270 degrees around. In an embodiment, when installed, the gap is at least 180 degrees around. In an embodiment, when installed, the gap is at least 120 degrees around. In an embodiment, the gap is at least 0.25 inches in height. In an embodiment, the gap is at least 0.5 inches in height. In an embodiment, the gap is at least 0.75 inches in height.

In an embodiment, the protective cover has brushes for restricting entry of small animals and insects. In an embodiment, the brushes are integrated into the protective cover.

In an embodiment, the protective cover further can include a neck element extending out the back side of the cover to further encompass exposed conductive elements of the power distribution device. In an embodiment, the neck element is rounded. In an embodiment, the neck element connected to the remainder of the protective cover by a clip.

In an embodiment, the neck element has two interior diameters. In an embodiment, the neck element fits over a collar on the main piece.

In an embodiment, the neck element having a fastener slot. In an embodiment, the fastener slot is configured to receive a clip tie.

In an embodiment, a protective cover for a multi-connector power distribution device, the protective cover is included having at least three substantially coverage lobes, each of the coverage lobes corresponding to a connector on the multi-connector power distribution device, and further can include interior shields restricting insect entry into central portions of the multi-connector power distribution device, further can include an internal stop retaining the protective cover at a defined height above the power distribution device.

In an embodiment, the protective cover includes at least three coverage lobes. In an embodiment, the protective cover is electrically non-conductive. In an embodiment, the lobes further can include a relief cut. In an embodiment, the lobes further include a snap clip for securing to the power distribution device.

In an embodiment, further can include two snap clips on opposed sides of the protective cover.

In an embodiment, further can include an internal stop retaining the protective cover at a defined height above the power distribution device.

In an embodiment, the concave coverage lobes are rounded.

In an embodiment, further can include interior shields restricting insect entry into central portions of the multi-connector power distribution device.

In an embodiment, the interior shields isolate the central portions of the multi-connector power distribution device.

In an embodiment, wherein when installed the protective cover has a gap near outer lobes that allows for a conductor to extend out.

In an embodiment, wherein when installed the gap is at least 270 degrees around.

In an embodiment, wherein when installed the gap is at least 180 degrees around.

In an embodiment, wherein when installed the gap is at least 120 degrees around.

In an embodiment, the protective cover has brushes for restricting entry of small animals and insects.

In an embodiment, the brushes are integrated into the protective cover.

In an embodiment, the gap is at least 0.25 inches in height.

In an embodiment, the gap is at least 0.5 inches in height.

In an embodiment, the gap is at least 0.75 inches in height.

In an embodiment, the protective cover further can include a neck element.

In an embodiment, the neck element is rounded.

In an embodiment, the neck element connected to the remainder of the protective cover by a clip.

In an embodiment, the neck element having a fastener slot.

In an embodiment, the fastener is configured to receive a clip tie.

In an embodiment, the neck element has two interior diameters.

In an embodiment, a protective cover for a multi-connector power distribution device, the protective cover is included having at least three substantially coverage lobes, each of the coverage lobes corresponding to a connector on the multi-connector power distribution device, and further can include interior shields restricting insect entry into central portions of the multi-connector power distribution device, further can include an internal stop retaining the protective cover at a defined height above the power distribution device, wherein the protective cover is electrically non-conductive, wherein the lobes further can include a relief cut, and wherein the lobes further include a snap clip for securing to the power distribution device.

In an embodiment, further can include two snap clips on opposed sides of the protective cover.

In an embodiment, further can include an internal stop retaining the protective cover at a defined height above the power distribution device.

In an embodiment, the concave coverage lobes are rounded.

In an embodiment, further can include interior shields restricting insect entry into central portions of the multi-connector power distribution device.

In an embodiment, the interior shields isolate the central portions of the multi-connector power distribution device.

In an embodiment, wherein when installed the protective cover has a gap near outer lobes that allows for a conductor to extend out.

In an embodiment, wherein when installed the gap is at least 270 degrees around.

In an embodiment, wherein when installed the gap is at least 180 degrees around.

In an embodiment, wherein when installed the gap is at least 120 degrees around.

In an embodiment, the protective cover has brushes for restricting entry of small animals and insects.

In an embodiment, the brushes are integrated into the protective cover.

In an embodiment, the gap is at least 0.25 inches in height.

In an embodiment, the gap is at least 0.5 inches in height.

In an embodiment, the gap is at least 0.75 inches in height.

In an embodiment, the protective cover further can include a neck element.

In an embodiment, the neck element is rounded.

In an embodiment, the neck element connected to the remainder of the protective cover by a clip.

In an embodiment, the neck element having a fastener slot.

In an embodiment, the fastener is configured to receive a clip tie.

In an embodiment, the neck element has two interior diameters.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Aspects may be better understood with reference to the following examples. These examples are intended to be representative of specific embodiments, but are not intended as limiting the overall scope of embodiments herein.

The present disclosure provides a wildlife protective cover for electrical power equipment and electrical power equipment mounting devices. The wildlife guard features an electrically non-conductive material for covering the complete top portion and at least a portion of the steel mounting bracket. The cover being adapted to mount upon the bracket on the end of the fiberglass standoff bracket.

The wildlife protective cover has a retention snap clip to initially secure it to the bracket on the front lobe portion, possibly all three extension lobes, and on multiple positions for other configurations of the wildlife cover, with optional reinforcement on zip ties available on both or all three noses of the guard.

The wildlife protective cover also features vertical relief cuts to assist the snap feature. The snap securements and optional zip tie features prevent or assist the cover from being lifted vertically or moving horizontally on the bracket. The lobes of the wildlife cover features a hardware cover and cutaway where multiple configurations of equipment can be mounted to the hardware features inherent to the bracket itself.

The cover is used to mitigate possible contact an animal could make with the metal surface of the bolt mounted underneath. Within those cutaway section, the back portion features additional shields that deter other animals from nesting underneath the wildlife guard. The rear side of the guard includes a cover interface receiving port that will allow a neck cover to complete the coverage of the metal bracket features, where the neck cover can operate to further secure the wildlife cover for bracket arm that are designed a zero-degree mount or fifteen-degree mounting angles.

The wildlife protective cover includes a neck cover that uses a retention tab to enter the previously mentioned port, and an additional optional zip tie channel. The shape continues downward beyond the metal bracket like a waterfall type feature that further reduces the opportunity for an animal or an animals extremity from making contact with the metal bracket underneath.

Figure 1:
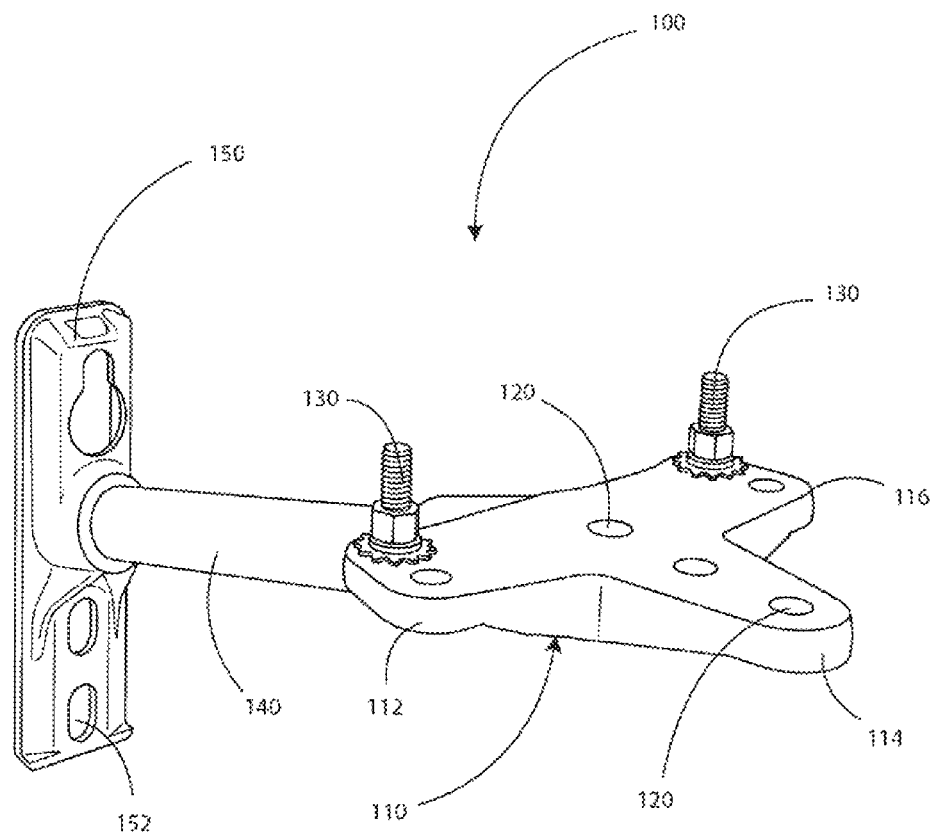
FIG. 1 is a multi-connector power distribution device (or bracket) of the type often used on electric power poles.

Now in reference to the figures, FIG. 1 is a multi-connector power distribution device 100 (or bracket) of the type often used on electric power poles. The multi-connector power distribution device 100 includes a base portion 110 having a plurality of threaded holes 120 for receipt of bolts 130. In the depicted embodiment some of the threaded holes 120 include bolts 130, while some do not (the multi-connector power distribution device 100 is typically configurable to have various locations for attachments that can be varied at the discretion of the user). The multi-connector power distribution device 100 includes three extended areas: left extension 112, central extension 114, and right extension 116. The base portion 110 of the multi-connector power distribution device 100 is connected to a mounting shaft 140, typically made of fiberglass, which is then mounted by means of a bracket 150 including mounting holes 152 to a utility pole or other surface (not shown).

Figure 2:
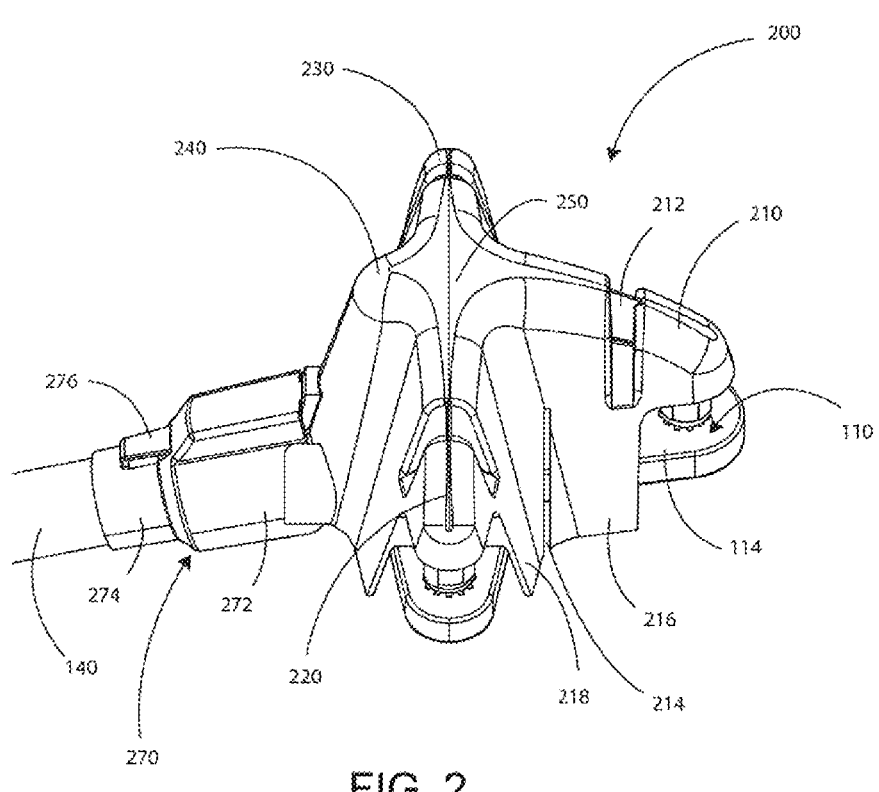
FIG. 2 is a perspective view of a protective cover made in accordance with the present disclosure, installed on a multi-connector power distribution device.

FIG. 2 is a perspective view of a protective cover 200 made in accordance with the present disclosure, installed on a multi-connector power distribution device 100. The protective cover 200 includes three lobes: a central lobe 210, a left lobe 220, and a right lobe 230. Each of these lobes corresponds to an extension area on the multi-connector power distribution device 100; specifically the lobes overlie the: left extension 112, central extension 114, and right extension 116 of the multi-connector power distribution device 100. It will be appreciated that there can be more or fewer than three lobes, although three lobes is the most common configuration. The protective cover 200 can also include a rear region 240 that is lobe-like, but typically does not also cover a connector.

As shown in FIG. 2, the protective cover 200 can include flap 216 and flap 218 which are separated by a relief cut 214. This relief cut (and the flaps) can be on both sides of the central lobe 210. The relief cut allows the central lobe 210 to flex up and down slightly during installation. Other relief cuts can also be provided, such as on both sides of the left lobe 220 or right lobe 230.

The protective cover 200 can include fastener mounting regions 212 for receiving a fastener, such as a zip tie, to secure the protective cover 200 in place on the multi-connector power distribution device 100.

FIG. 2 also shows a neck element 270, which is also often installed and can be provided separate from the protective cover 200. The neck element 270 is also non-conductive, and secured to the protective cover 200 to provide further protection from undesired electrical events. It does this by covering any other exposed metal surfaces on the distribution device 200 (such as mounting regions for securing to the fiberglass shaft 140). The neck element 270 typically has a wider portion 272 and a more narrow portion 274. The wider portion 272 is positioned against the protective cover 200, while the more narrow portion 274 makes contact with the fiberglass shaft 140. In addition, a fastener receiver 276 can be present for receiving a zip-tie or other fastener to help retain the neck element 274 secured to the fiberglass shaft 140.

Figure 3:
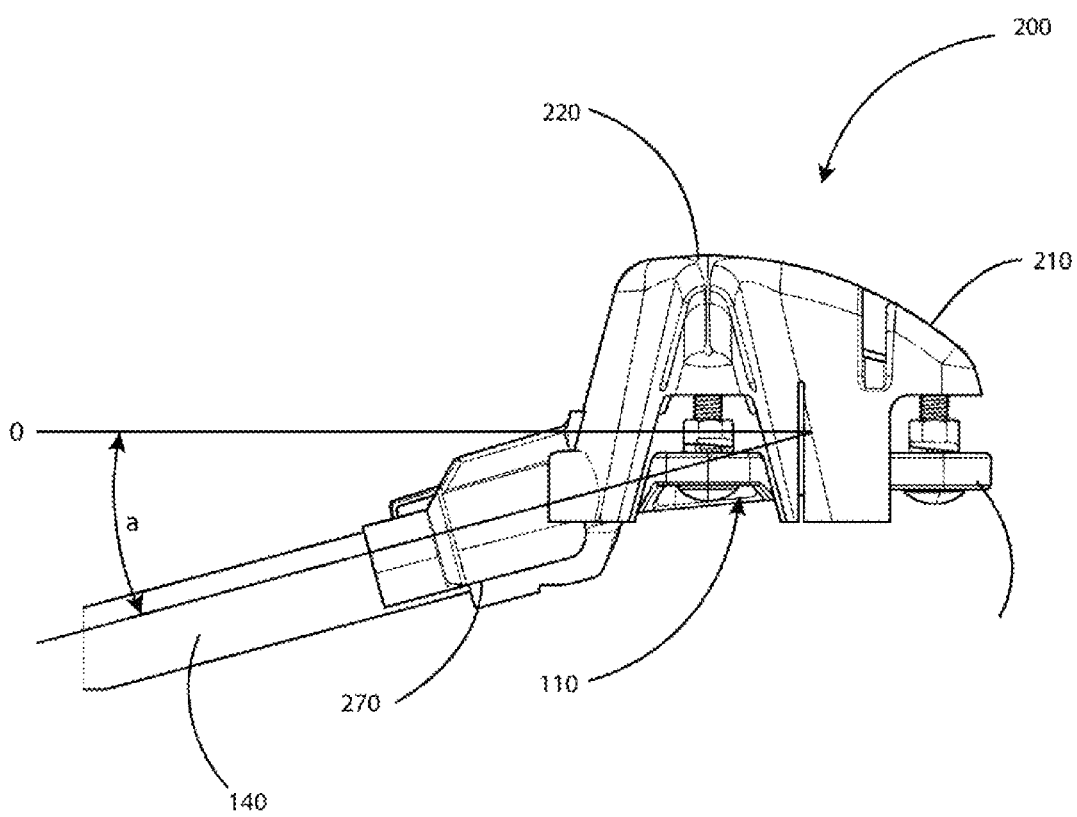
FIG. 3 is a side elevational view of a protective cover made in accordance with the present disclosure, installed on a multi-connector power distribution device.

FIG. 3 is a side elevational view of a protective cover 200 made in accordance with the present disclosure, installed on the base element 110 of a multi-connector power distribution device. Central lobe 210 is shown, along with left lobe 220 and neck element 270 and fiberglass mounting shaft 140. The fiberglass mounting shaft 140 and the plane formed by the base element 110 are often angled relative to one another by angle "a". Angle a can be zero, when the fiberglass mounting shaft 140 and the base element 110 are parallel to one another, or this angle a can be greater than 0, such as 5 degrees, 10 degrees, 15 degrees, 20 degrees, 25 degrees or 30 degrees. Often the angle a is about 10 to 20 degrees, and commonly around 15 degrees. The neck element 270 is designed so that it can be installed on the fiberglass mounting shaft 140 at different angles relative to the protective cover 200, while still providing protection. Thus, a single configuration of protective cover 200 and neck element 270 can be used with constructions with a range of angles a between the fiberglass mounting shaft 140 and neck element 270.

Figure 4:
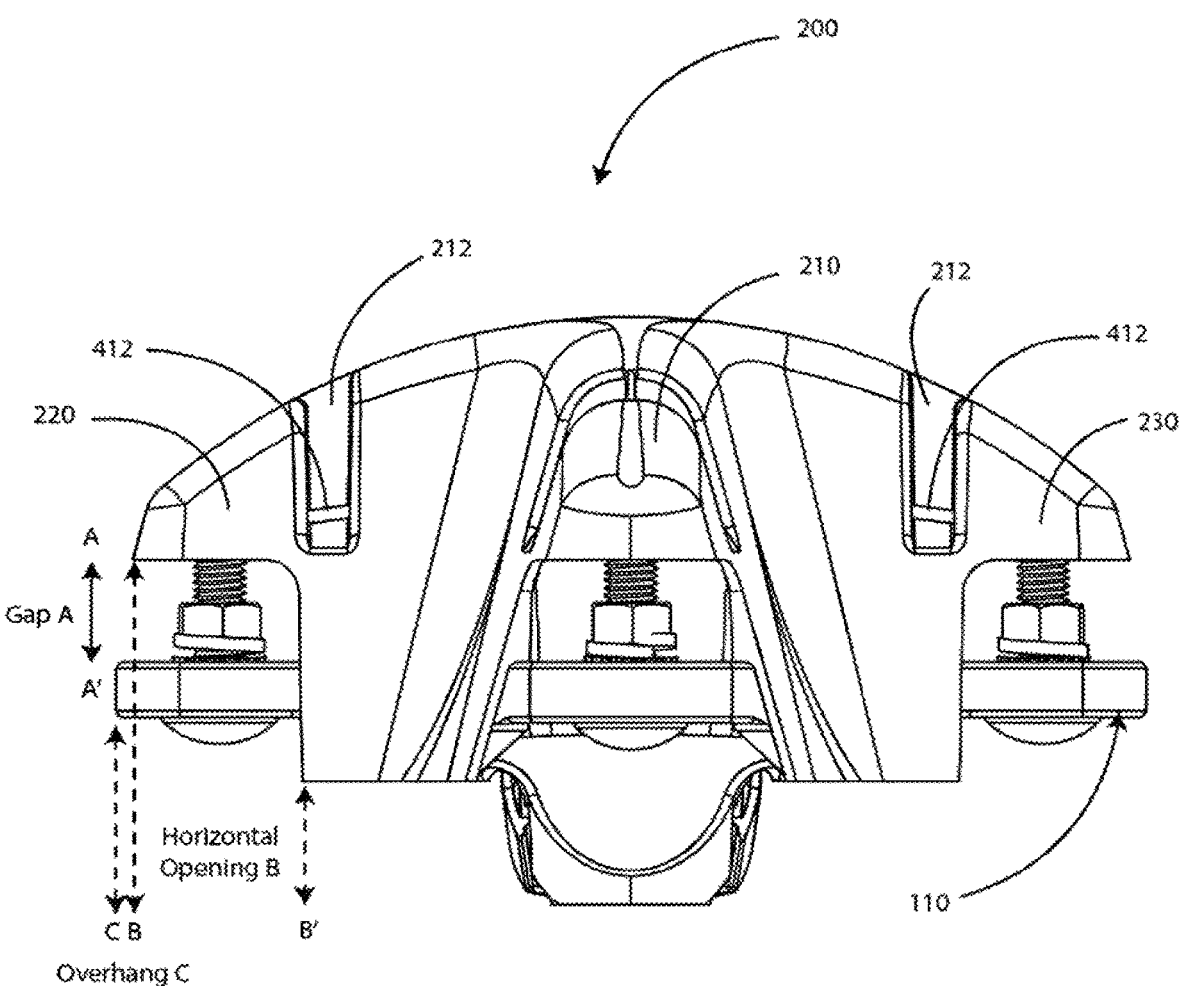
FIG. 4 is a front view of a protective cover made in accordance with the present disclosure, installed on a multi-connector power distribution device.

FIG. 4 is a front view of a protective cover 200 made in accordance with the present disclosure, installed on a multi-connector power distribution device 100, including the base element 110. FIG. 4 shows how the protective cover 200 limits exposure of the base element 110, while still allowing access to bolts on the interior of the base element 110. In particular, FIG. 4 shows how there is a Gap A from the top of the base element 110 to the underside of the left lobe 220 of the protective cover. This distance Gap A is shown by line A-A'. The Gap A should be large enough to allow for hardware (such as wire conductors) to extend out from the bolts mounting them to the base element 110, but not so great that excess access into the area under the protective cover 200 can occur (so as to avoid entrance of various wildlife). The Gap A is typically less than 2 inches, and more typically less than 1.5 inches and less than 1.0 inches. In some embodiments the Gap A is less than 0.75 inches or 0.5 inches. However, in most implementations the Gap A is greater than 0.5 inches and greater than 0.75 inches.

FIG. 4 also shows a Horizontal Opening B, this Horizontal Opening B corresponding to distance B-B', and is the distance from the edge of the protective cover 200 adjacent to the top surface of the base element 110. This distance for Horizontal Opening B can vary, but is typically about one inch, but can be 0.75 to 3.0 inches, or from 1.0 to 2.0 inches. Various other distances for Horizontal Opening B can be used.

In addition, FIG. 4 shows the overhang from the protective cover 200 to the base element 110. This Overhang C is generally quite small—either with the outer edge of the protective cover 200 recessed a bit from the outer edge of the base element 200, or with the outer edge of the protective cover 200 slightly overhanging the outer edge of the base element 200. It will be appreciated that a single protective cover 200 can be made to fit on multiple different base elements 200 produced by different manufacturers, so this Overhang C will have some variation.

Figure 5:
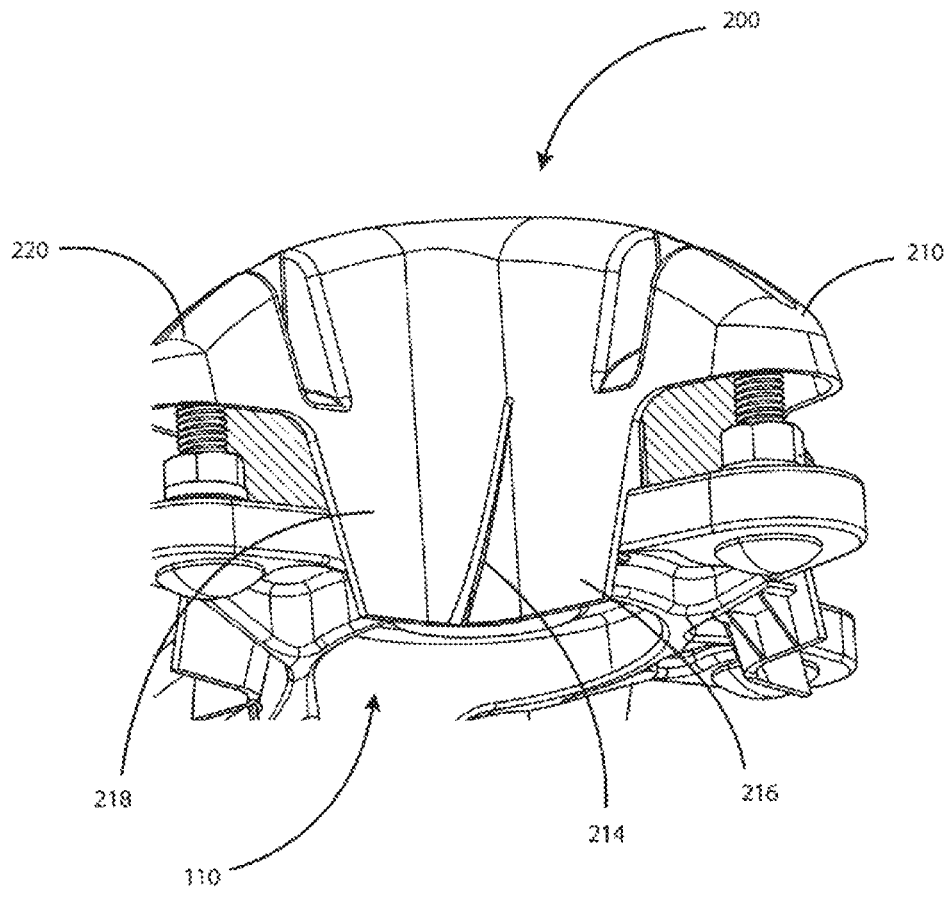
FIG. 5 is an enlarged perspective view of a protective cover made in accordance with the present disclosure, installed on a multi-connector power distribution device.

FIG. 5 is an enlarged perspective view of a protective cover 200 made in accordance with the present disclosure, installed on a multi-connector power distribution device 100 with base element 110. FIG. 5 shows how the protective cover 200 can include flap 216 and flap 218 which are separated by a relief cut 214. This relief cut (and the flaps) can be on both sides of the central lobe 210. The relief cut allows the central lobe 210 to flex up and down slightly during installation relative to lobe 220. Other relief cuts can also be provided, such as on both sides of the left lobe 220 or right lobe 230.

Figure 6:
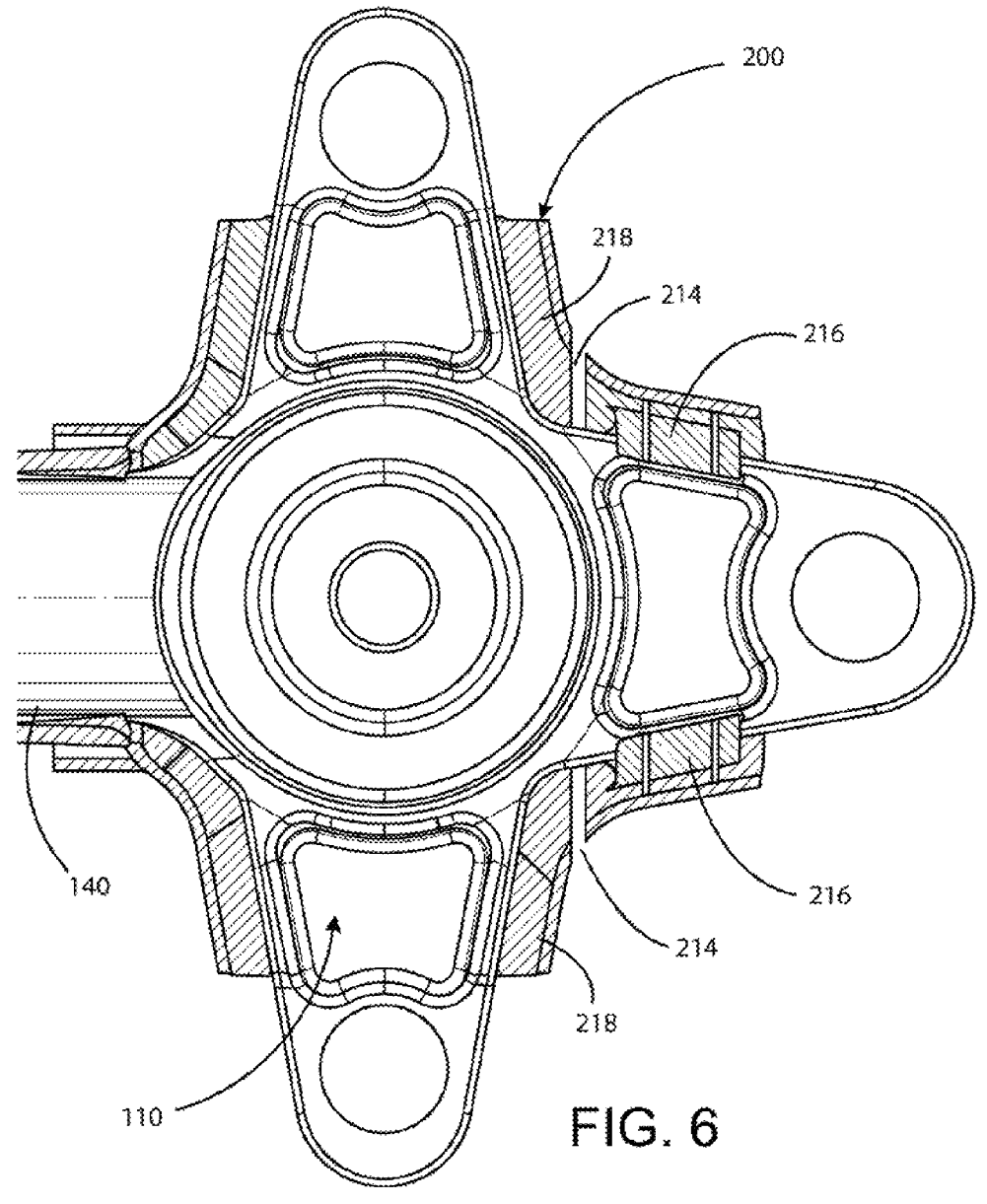
FIG. 6 is a bottom view of a protective cover made in accordance with the present disclosure, installed on a multi-connector power distribution device.

FIG. 6 is a bottom view of a protective cover 200 made in accordance with the present disclosure, installed on a multi-connector power distribution device. FIG. 6 shows how each side of the central lobe of the protective cover 200 can include flap 216 and flap 218 which are separated by relief cut 214. This relief cut (and the flaps) can be on both sides of the central lobe 210. The relief cut allows the central lobe 210 to flex up and down slightly during installation relative to lobe 220. Other relief cuts can also be provided, such as on both sides of the left lobe 220 or right lobe 230.

Figure 7:
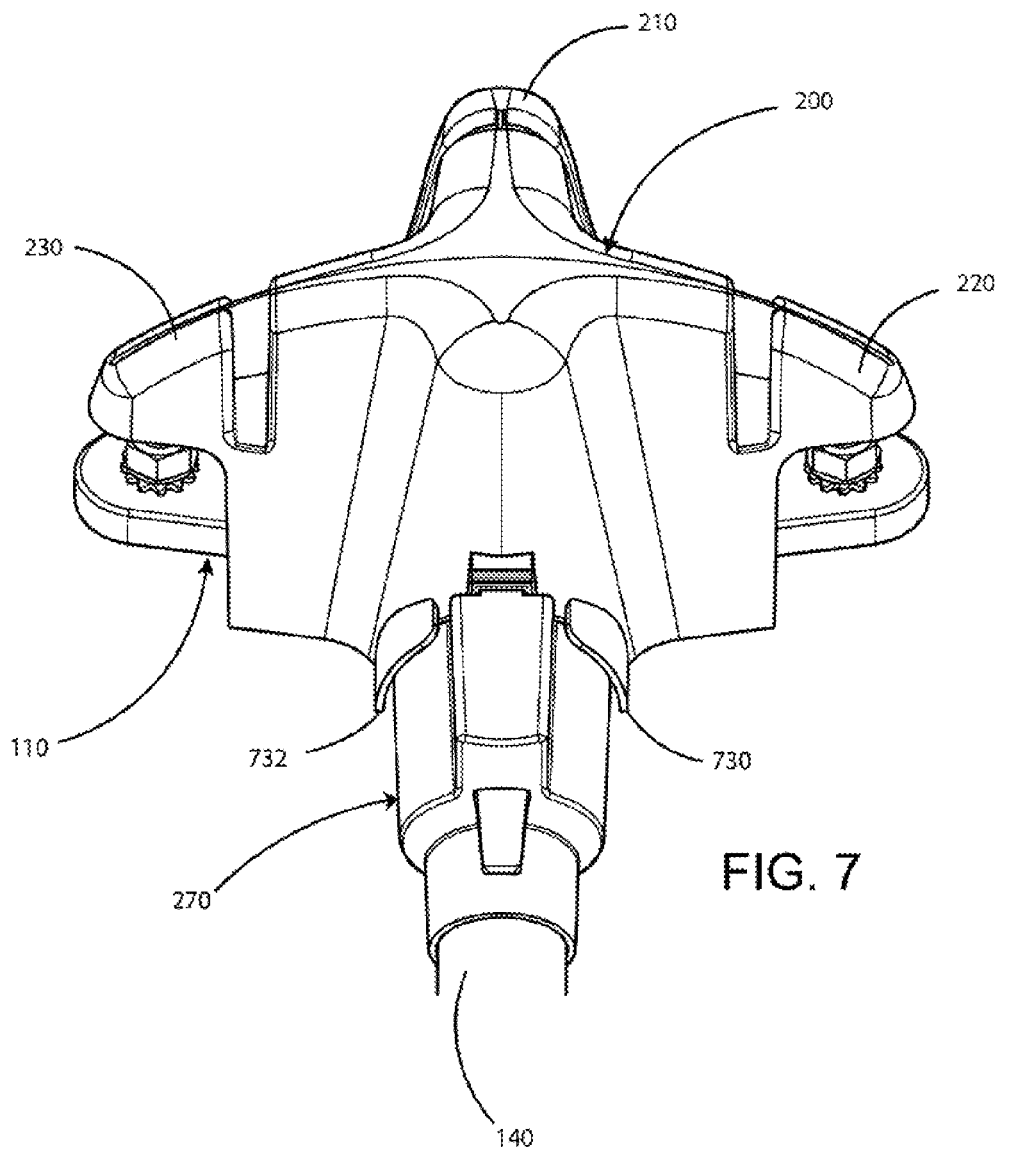
FIG. 7 is a back view of a protective cover made in accordance with the present disclosure, installed on a multi-connector power distribution device.
Figure 8:
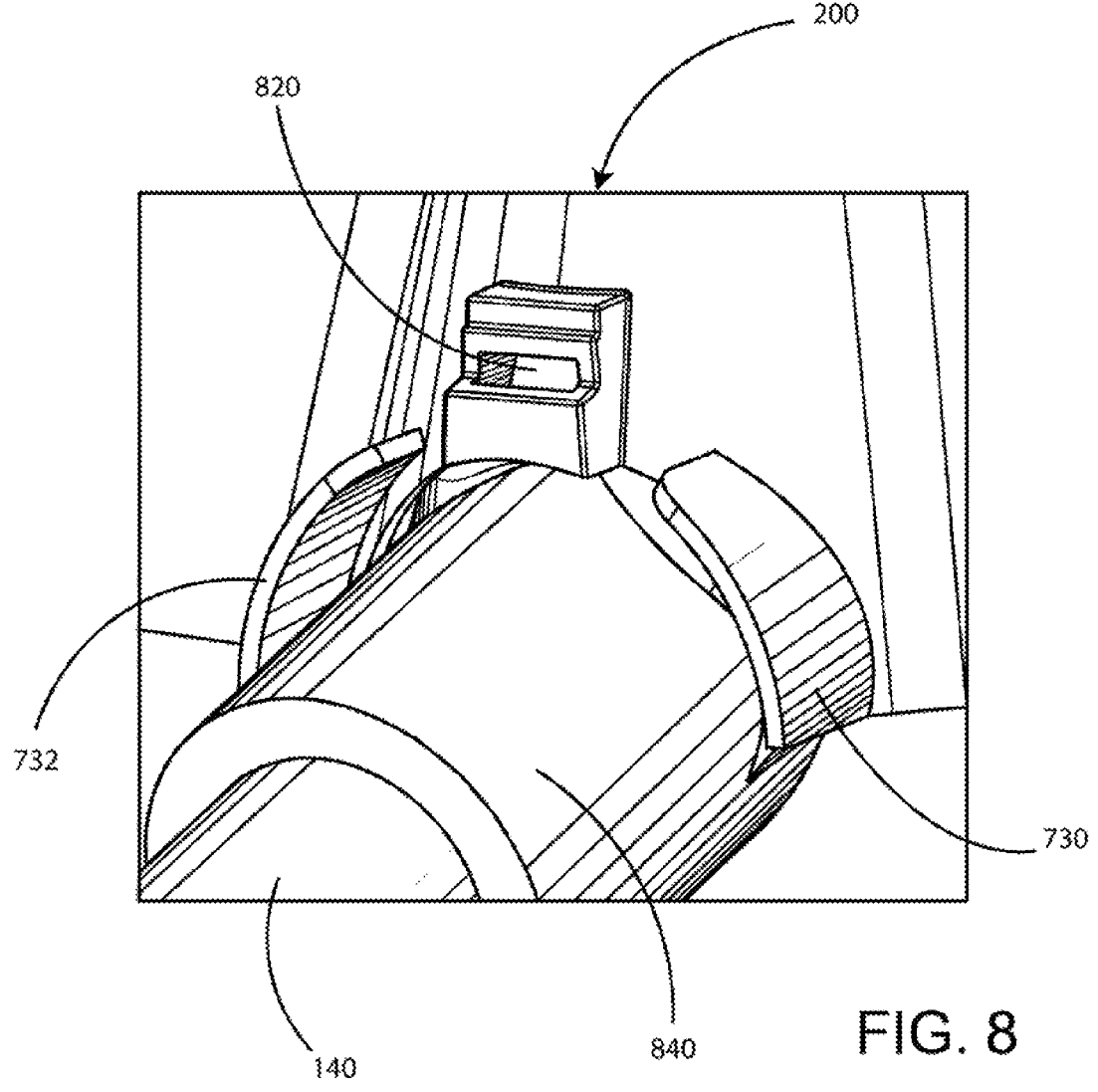
FIG. 8 is a back close-up view of a protective cover made in accordance with the present disclosure, installed on a multi-connector power distribution device.

FIG. 7 is a back view of a protective cover 200 made in accordance with the present disclosure, installed on a multi-connector power distribution device. As shown in FIG. 7, the protective cover 200 can include shoulder 730 and shoulder 732 that extend over a portion of the neck element 270. The shoulder 730 and shoulder 732 allow for flexing of the protective cover 200 relative to the neck element 270 (so that different orientations of protective cover 200 relative to the neck element are possible, as described above with regard to FIG. 3, while preserving protection from contact with conductive surfaces. FIG. 8 is a back close-up view of a protective cover 200 made in accordance with the present disclosure, installed on a multi-connector power distribution device 100, including a wide portion 840 of the multi-connector power distribution device 100 (such as a mounting region for securing to the fiberglass shaft 140.

Figures 9, 10:
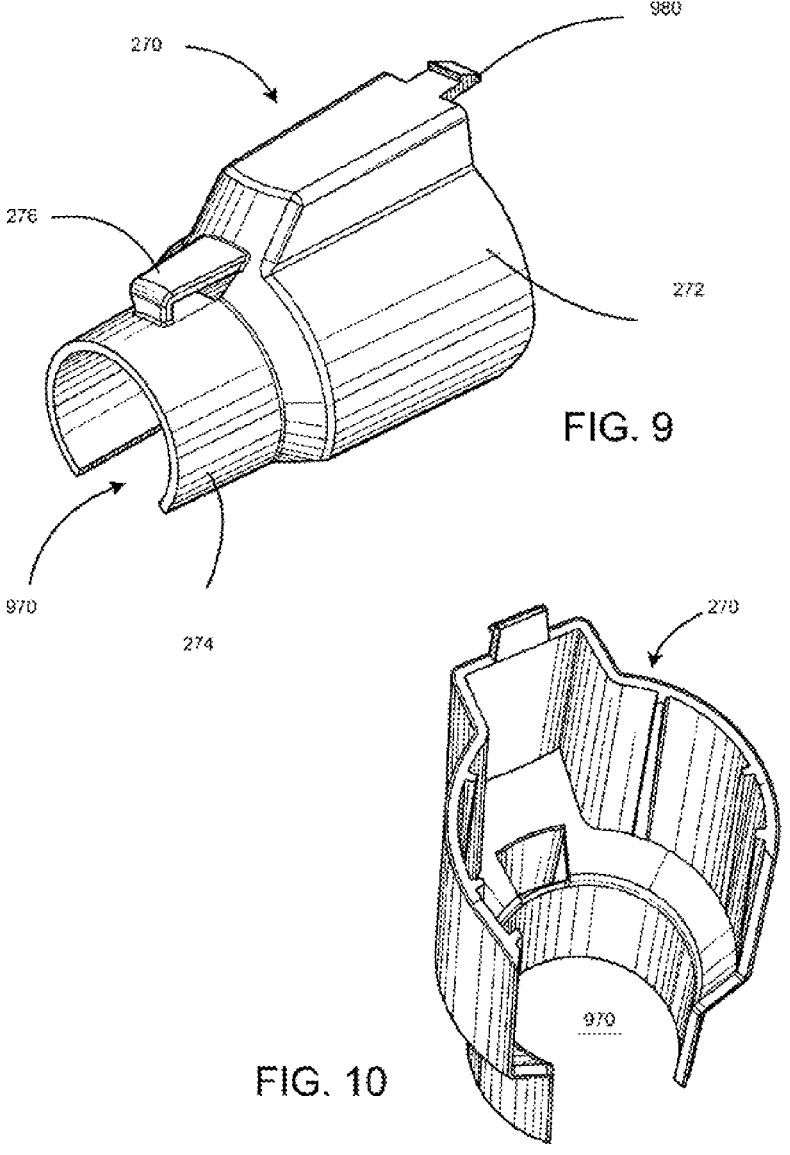
FIG. 9 is a perspective view of neck element of a protective cover made in accordance with the present disclosure.
FIG. 10 is a rear interior perspective view of neck element of a protective cover made in accordance with the present disclosure.

FIG. 9 is a perspective view of neck element 270 for use with a protective cover made in accordance with the present disclosure. FIG. 10 is a rear interior perspective view of neck element 270 of a protective cover made in accordance with the present disclosure. The neck element 270 includes a narrow interior portion 970 for securing to the fiberglass shaft, and also a tab 980 for securing to the protective cover 200.

Figure 11:
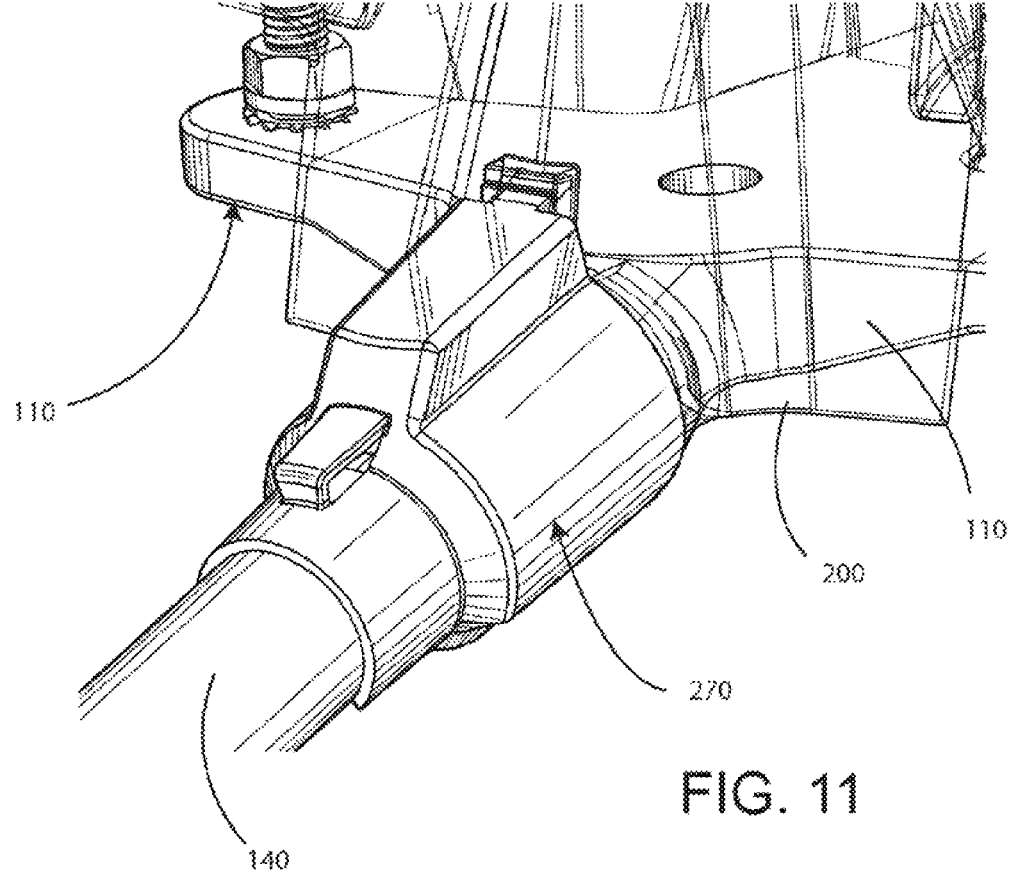
FIG. 11 is a perspective view of a neck element mounted with protective cover made in accordance with the present disclosure, installed on a multi-connector power distribution device.

FIG. 11 is a perspective view of a neck element 270 mounted with protective cover 200 made in accordance with the present disclosure, installed on the base element 100 a multi-connector power distribution device.

Figure 12:
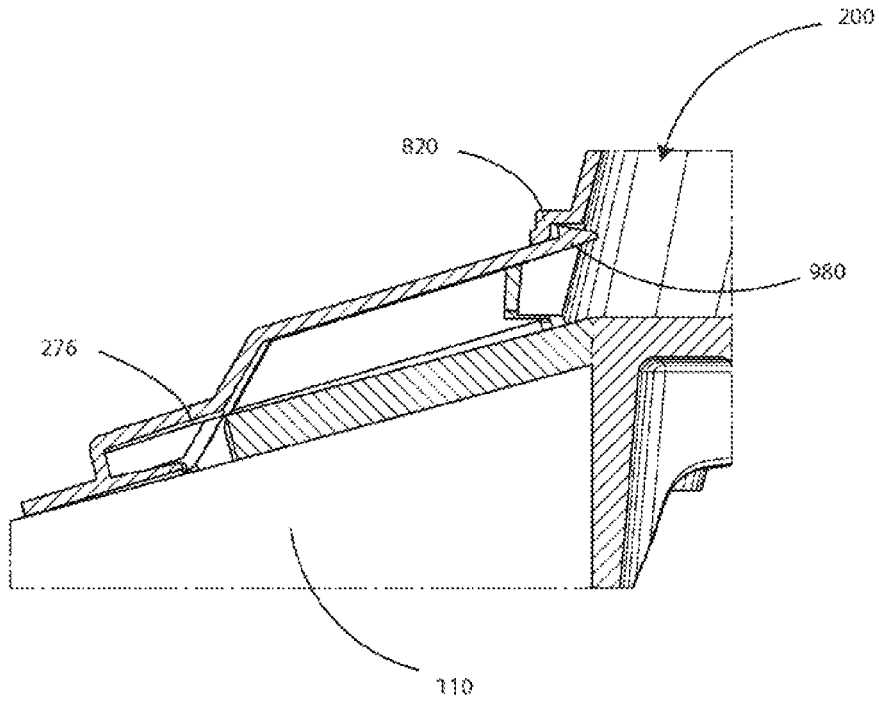
FIG. 12 is a side cut-away view of a neck element mounted with protective cover made in accordance with the present disclosure, installed on a multi-connector power distribution device. of a neck element mounted with protective cover made in accordance with the present disclosure, installed on a multi-connector power distribution device.

FIG. 12 is a side cut-away view of a neck element 270 mounted with protective cover 280 made in accordance with the present disclosure, installed on a multi-connector power distribution device.

Figure 13:
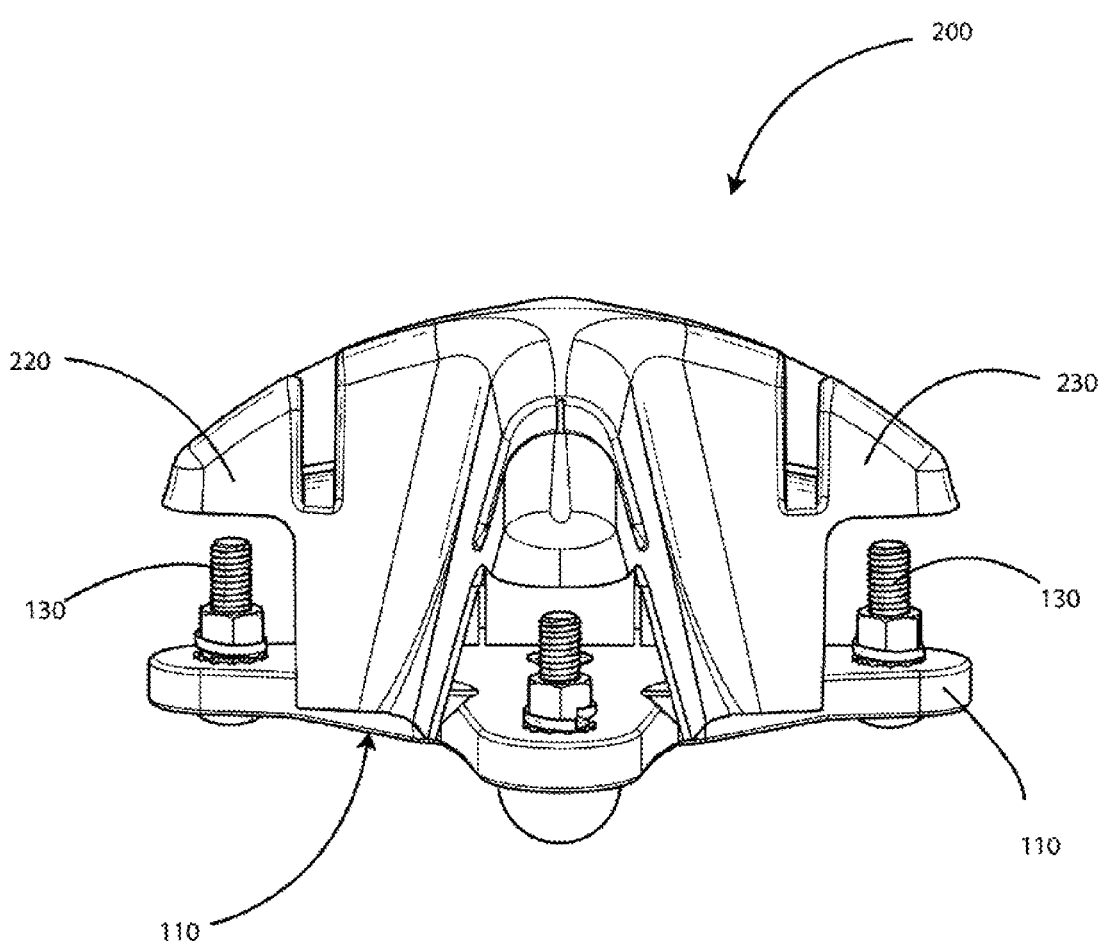
FIG. 13 is a front view of a protective cover made in accordance with the present disclosure, installed on a multi-connector power distribution device.
Figure 14:
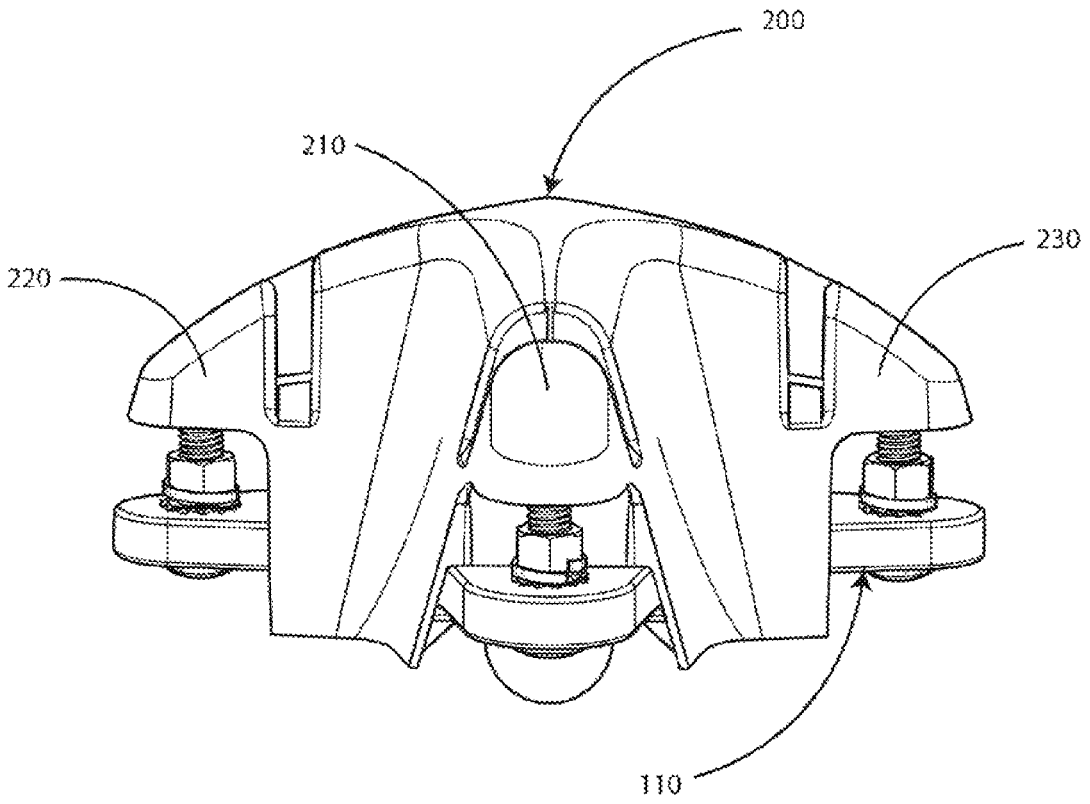
FIG. 14 is a front view of a protective cover made in accordance with the present disclosure, installed on a multi-connector power distribution device.

FIG. 13 is a front view of a protective cover 200 made in accordance with the present disclosure, installed on a multi-connector power distribution device. FIG. 14 is a front view of a protective cover 200 made in accordance with the present disclosure, installed on a multi-connector power distribution device.

Figure 15:
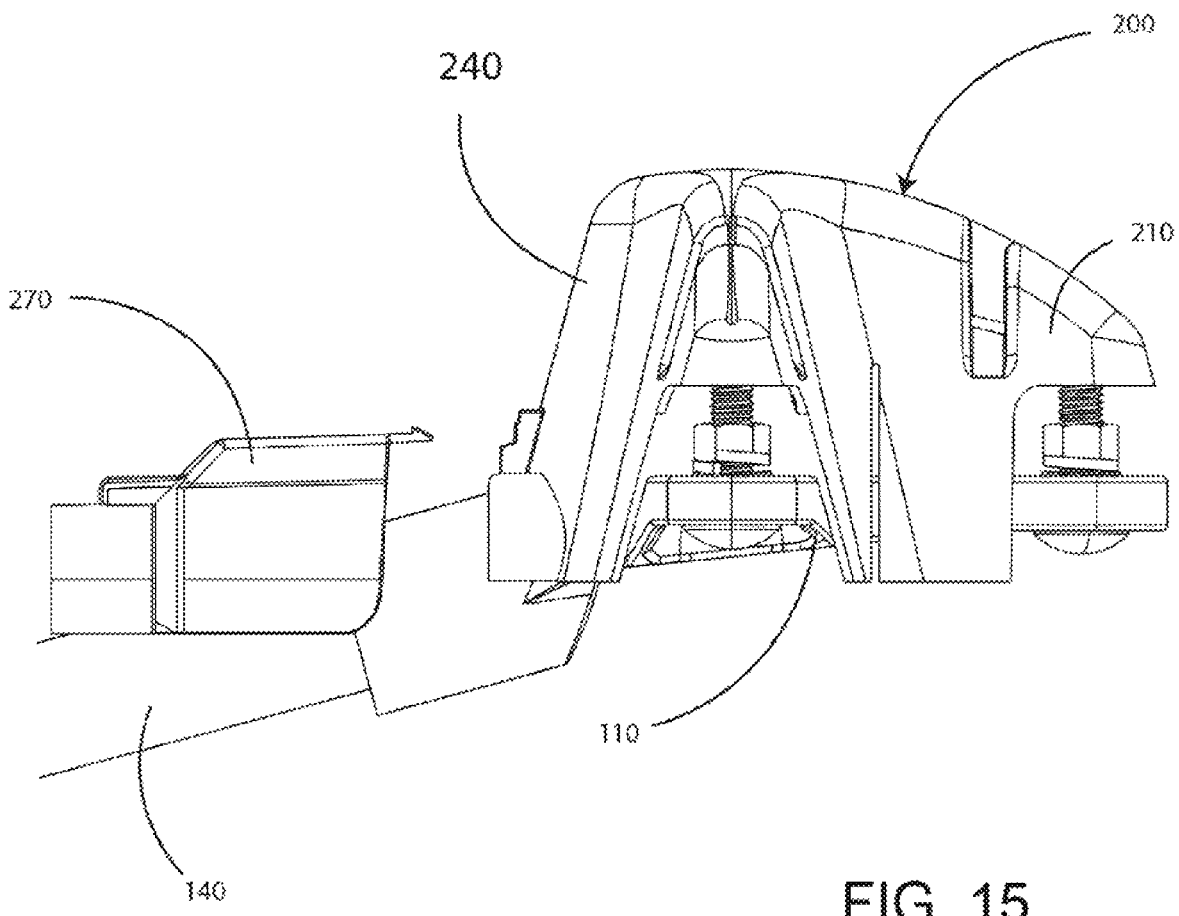
FIG. 15 is a side view of a protective cover made in accordance with the present disclosure, installed on a multi-connector power distribution device, along with a neck element being installed.
Figure 16:
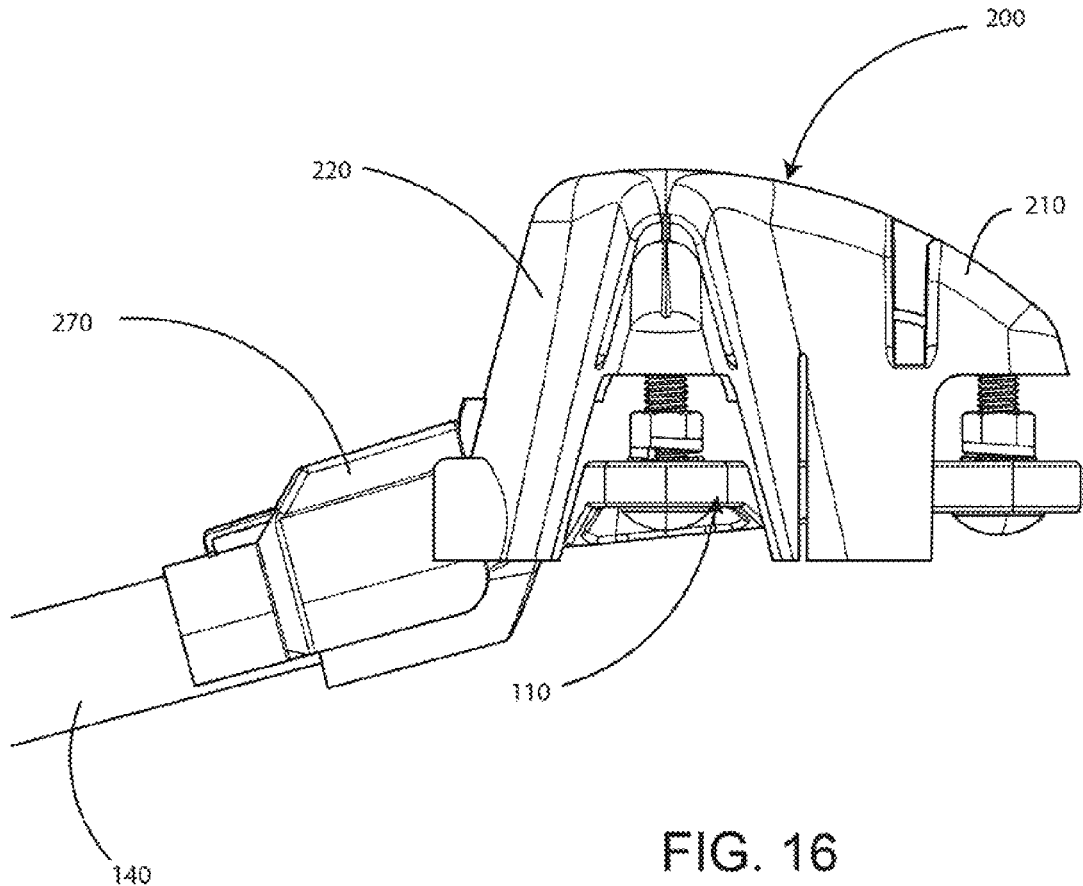
FIG. 16 is a side view of a protective cover made in accordance with the present disclosure, installed on a multi-connector power distribution device, along with a neck element installed.

FIG. 15 is a side view of a protective cover made in accordance with the present disclosure, installed on a multi-connector power distribution device, along with a neck element 270 being installed. FIG. 16 is a side view of a protective cover made in accordance with the present disclosure, installed on a multi-connector power distribution device, along with a neck element 270 installed.

Figure 17:
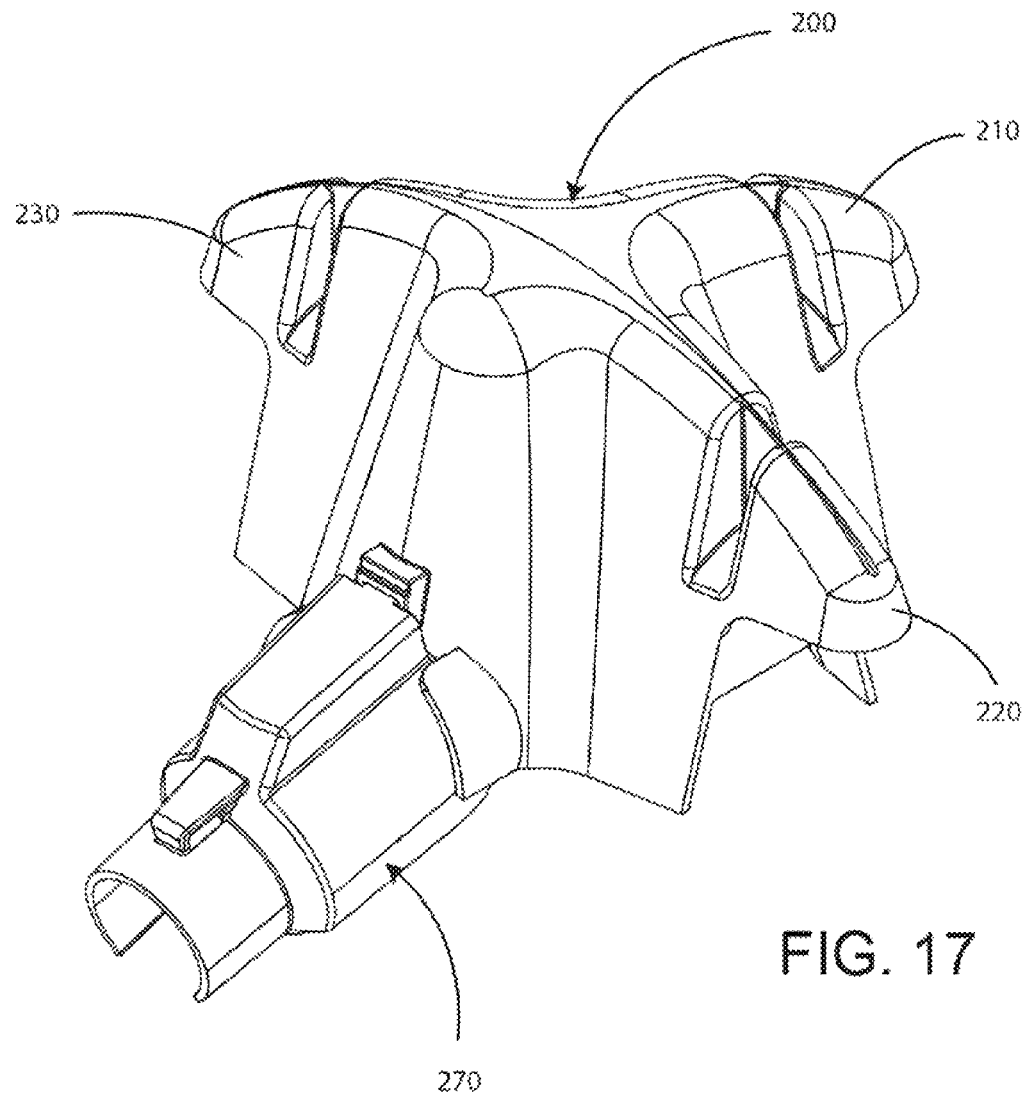
FIG. 17 is a rear perspective view of a protective cover made in accordance with the present disclosure, installed on a multi-connector power distribution device, along with a neck element installed.

FIG. 17 is a rear perspective view of a protective cover 200 made in accordance with the present disclosure, installed along with a neck element 270.

Figure 18:
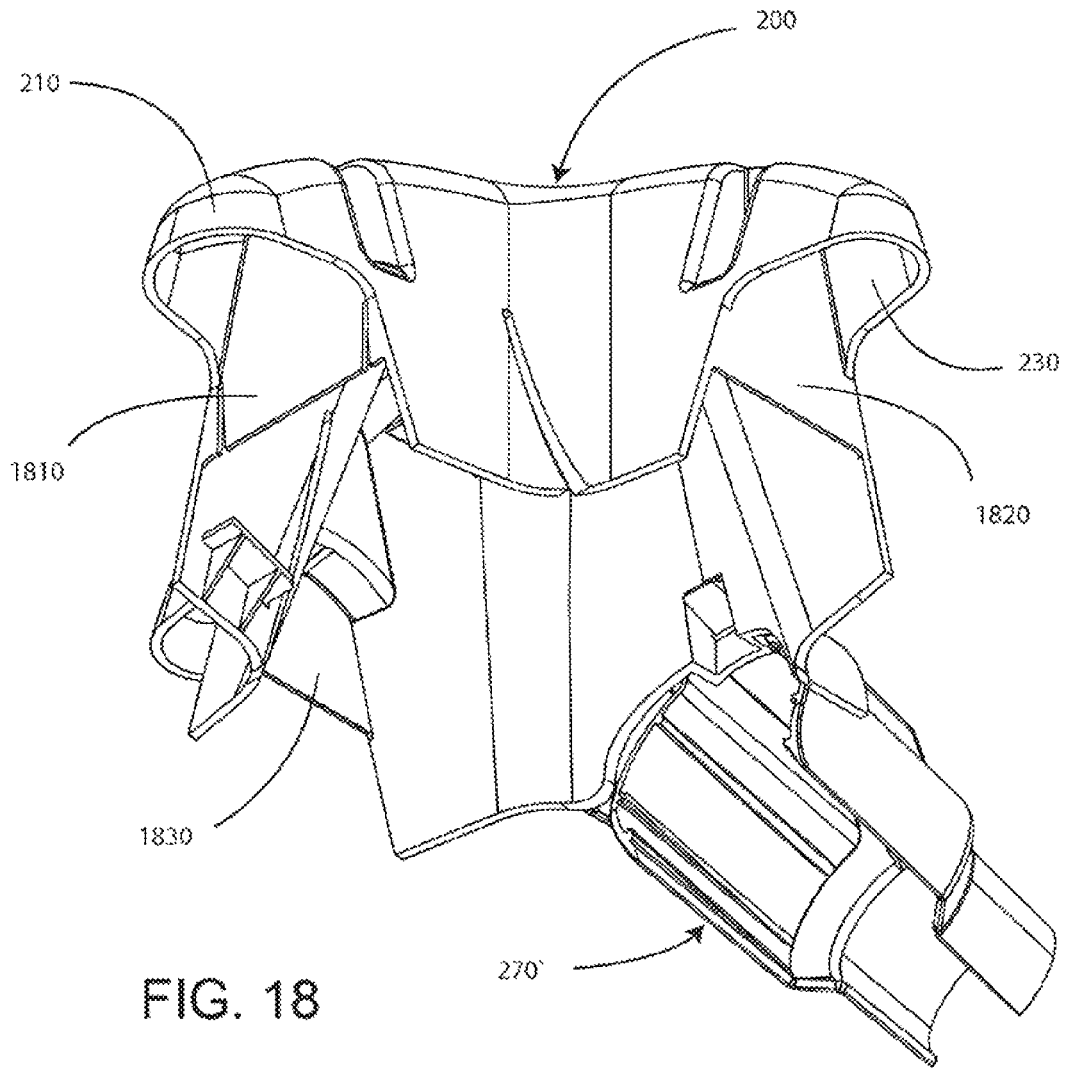
FIG. 18 is an underside perspective view of a protective cover made in accordance with the present disclosure, along with a neck element installed.
Figure 19:
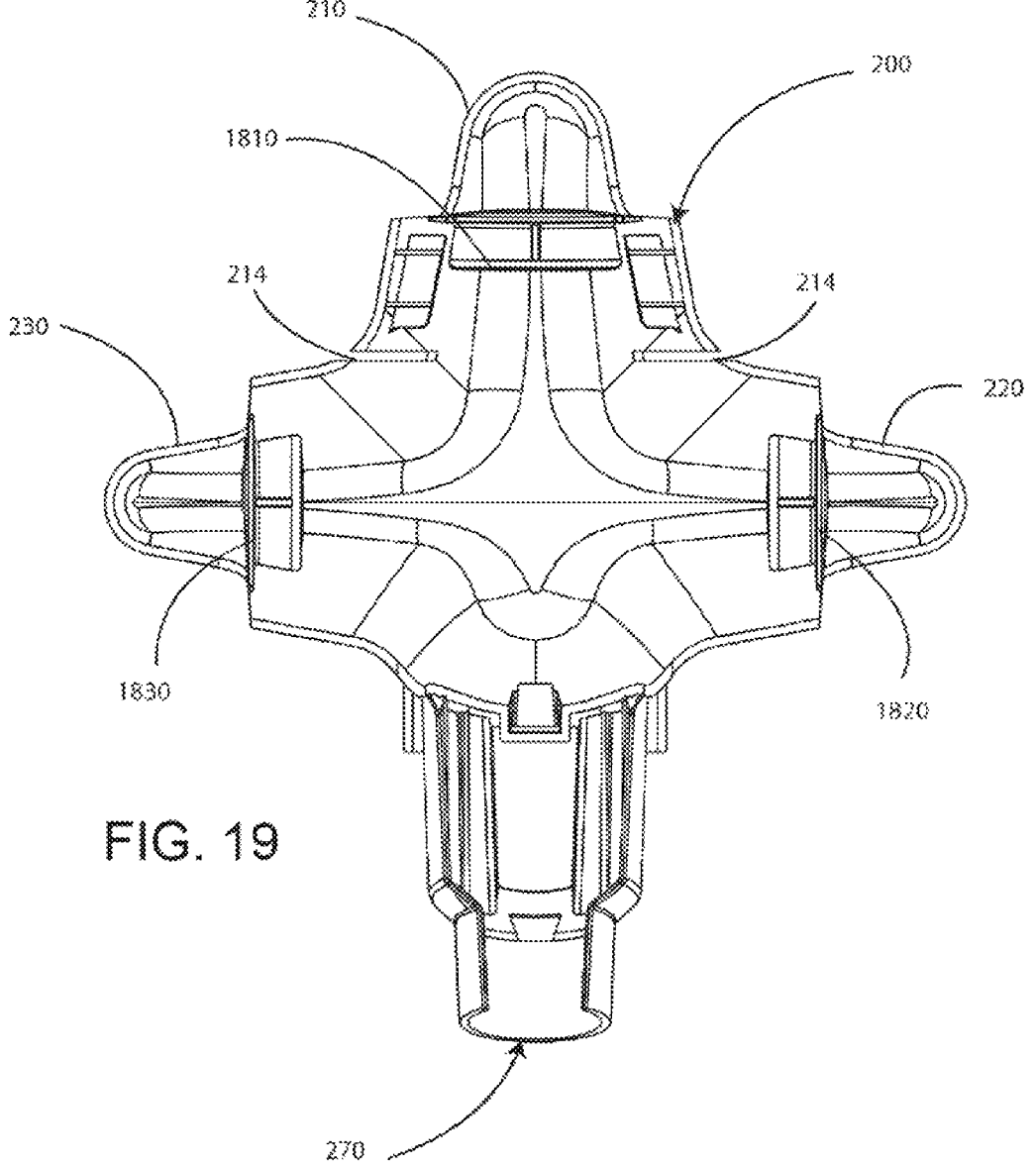
FIG. 19 is an underside view of a protective cover made in accordance with the present disclosure, along with a neck element installed.

FIG. 18 is an underside perspective view of a protective cover 200 made in accordance with the present disclosure, along with a neck element 270 installed. The underside includes interior shield 1810, interior shield 1820, and interior shield 1830 which rest on the top surface of the base element 110 (not shown) and prevent access by wildlife (such as insects) into the interior of the protective cover, while also controlling how low the protective cover 200 will go on top of the base element 110. FIG. 19 is an underside view of a protective cover made in accordance with the present disclosure, along with a neck element 270 installed.

Figure 20:
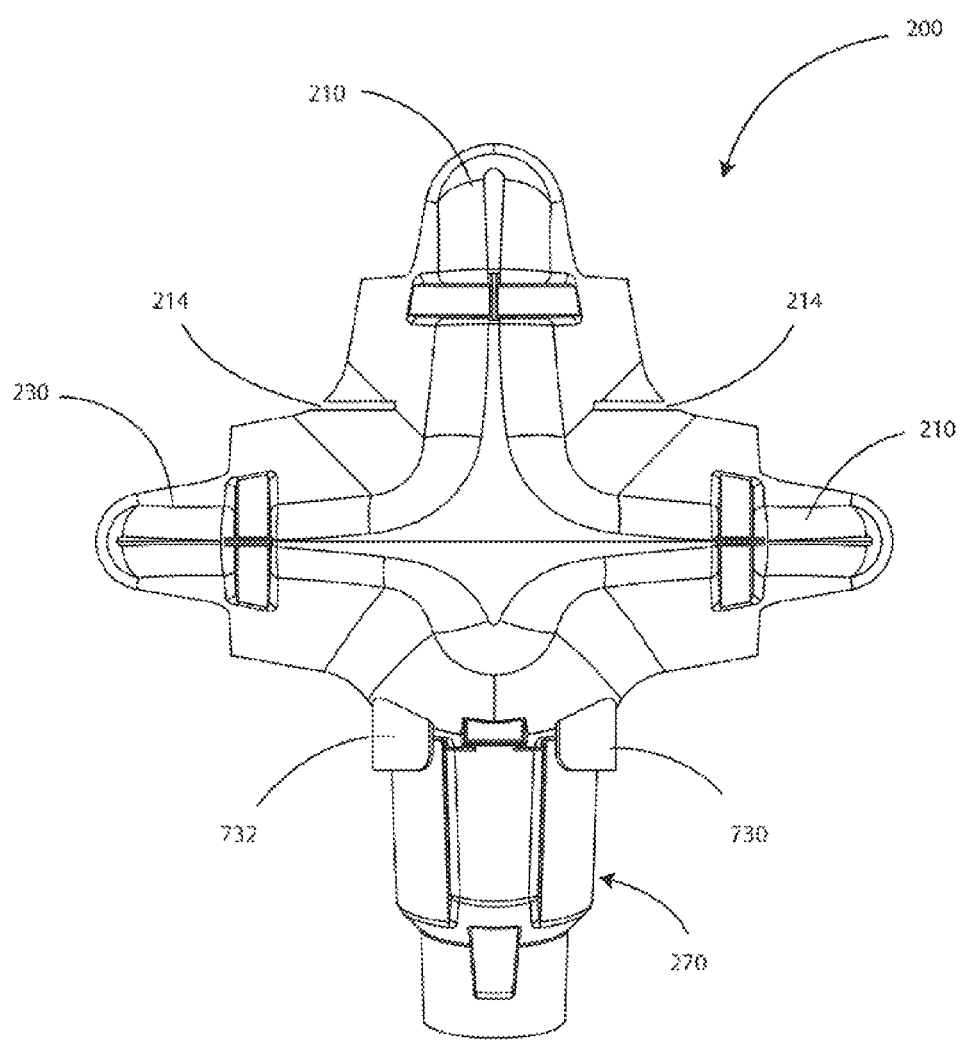
FIG. 20 is an underside view of a protective cover made in accordance with the present disclosure, along with a neck element installed.
Figure 21:
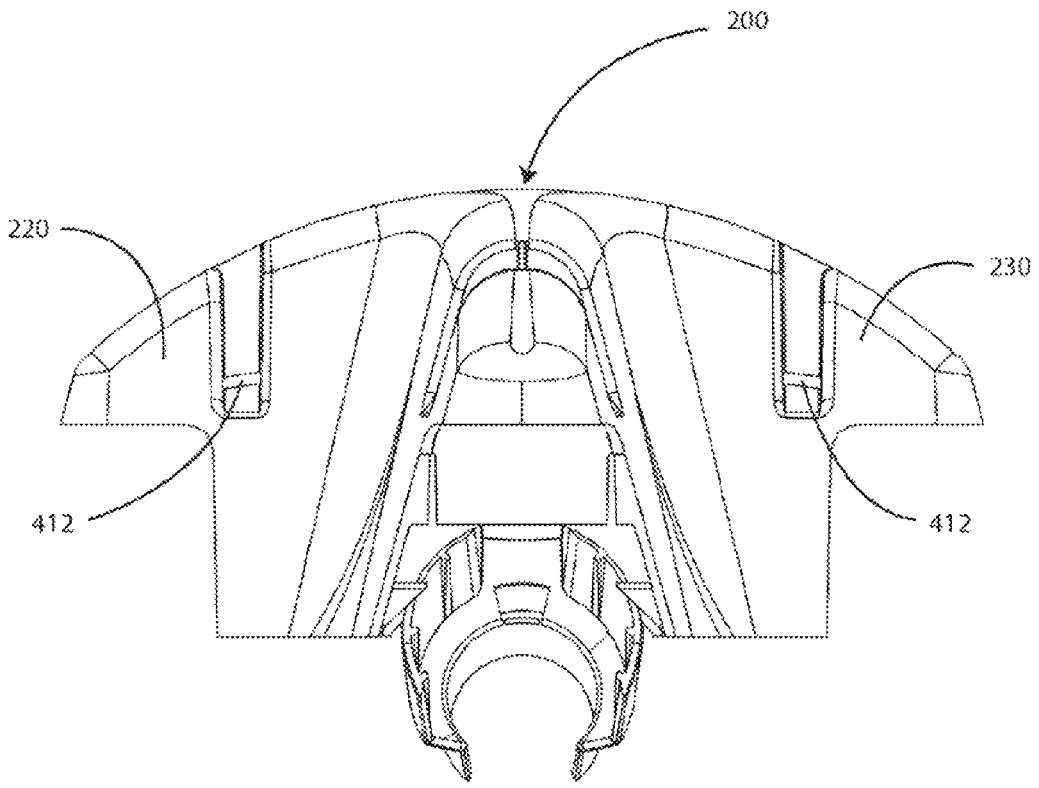
FIG. 21 is a front view of a protective cover made in accordance with the present disclosure, along with a neck element.
Figure 22:
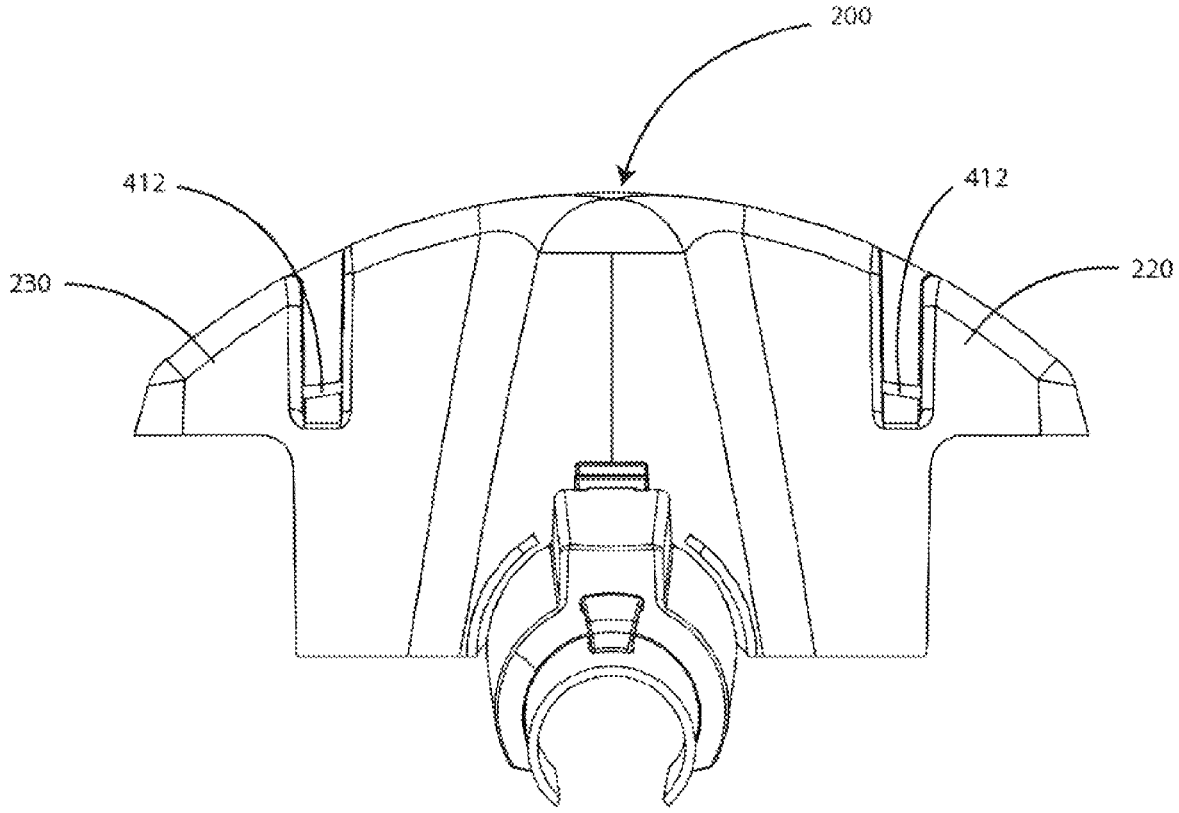
FIG. 22 is a back view of a protective cover made in accordance with the present disclosure, along with a neck element.

FIG. 20 is an underside view of a protective cover 210 made in accordance with the present disclosure, along with a neck element 270 installed. FIG. 21 is a front view of a protective cover 210 made in accordance with the present disclosure, along with a neck element 270. FIG. 22 is a back view of a protective cover made in accordance with the present disclosure, along with a neck element 270.

Figure 23:
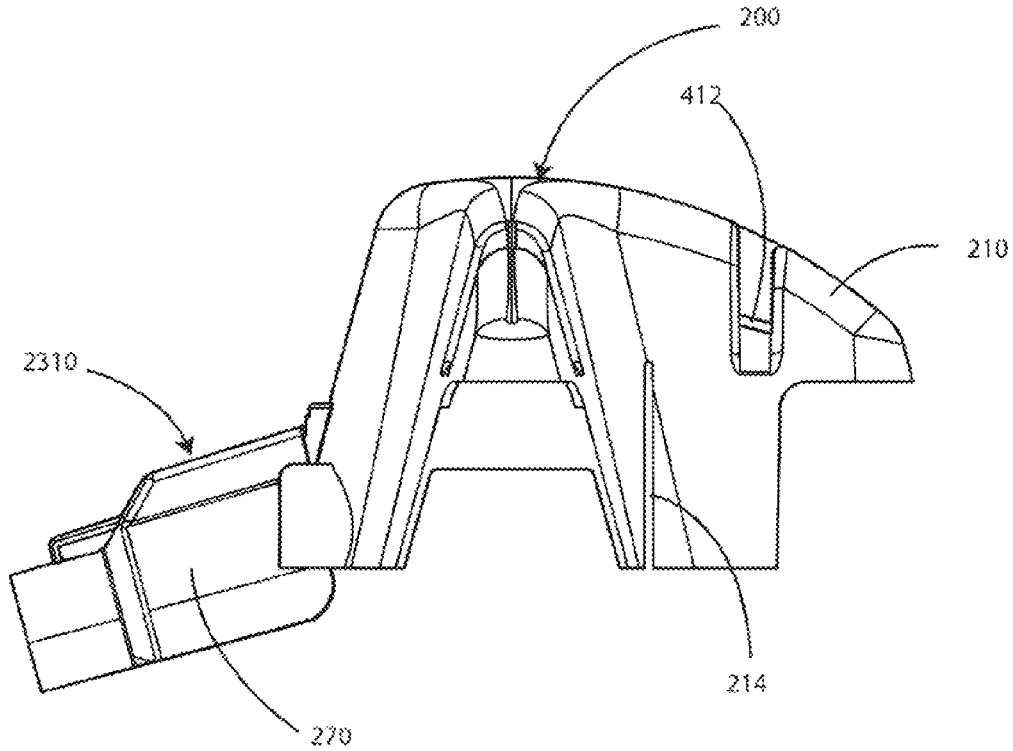
FIG. 23 is a side view of a protective cover made in accordance with the present disclosure, along with a neck element.

FIG. 23 is a side view of a protective cover 200 made in accordance with the present disclosure, along with a neck element 270. The neck element 270 includes a raised portion 2310 from which a tab 980 can extend for insertion into the protective cover (the tab 980 is shown in FIG. 9).

Figure 24:
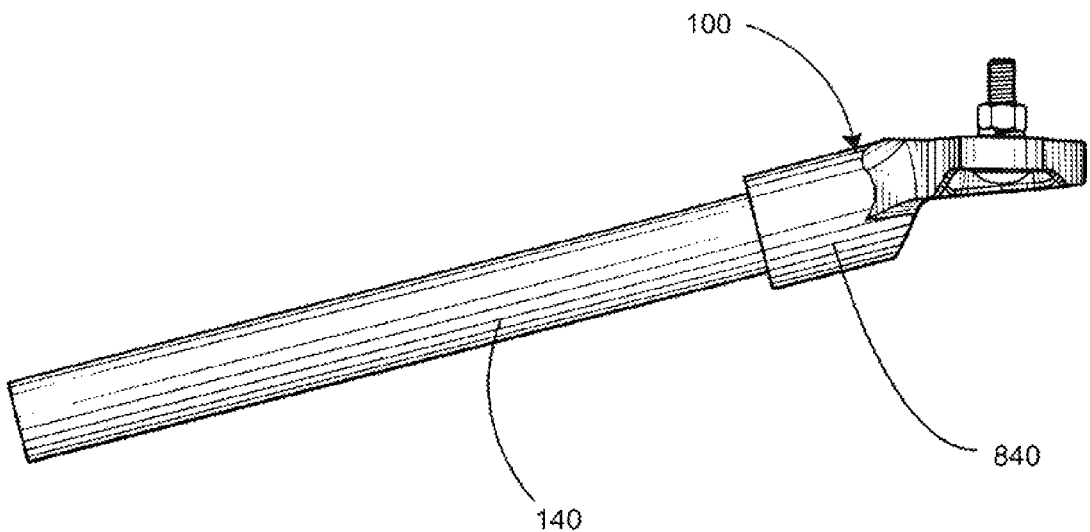
FIG. 24 is a multi-connector power distribution device (or bracket) of the type often used on electric power poles, the distribution device with two connector points.
Figure 25:
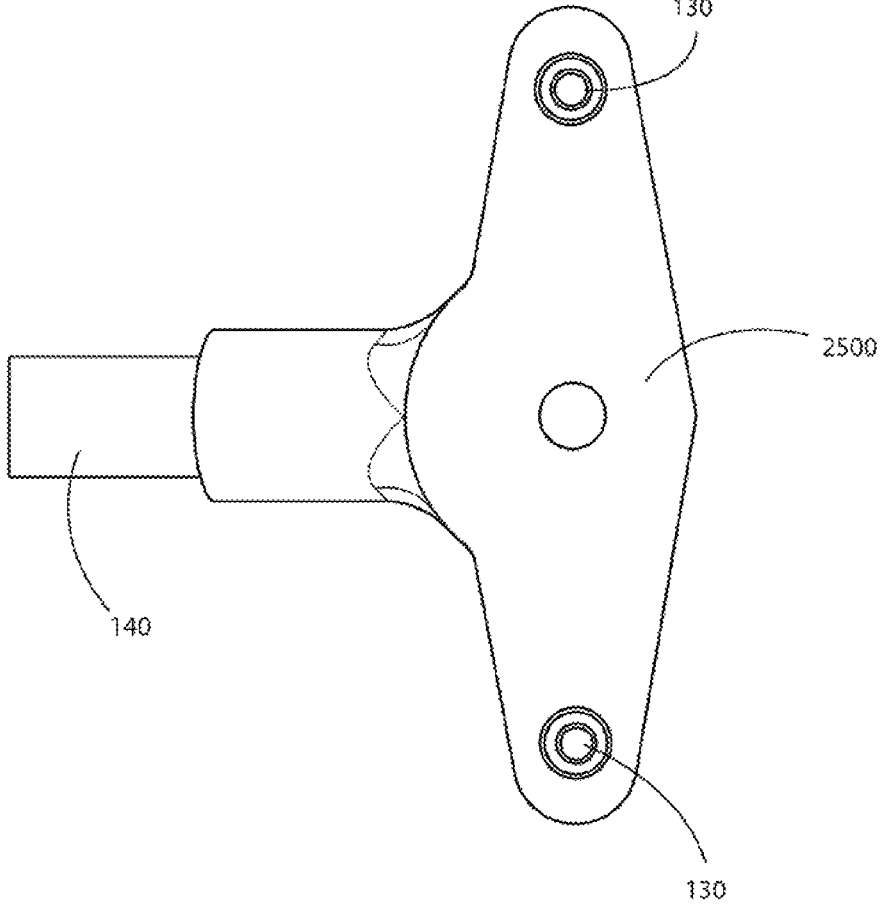
FIG. 25 is top view of power distribution device of FIG. 24.

FIG. 24 is a multi-connector power distribution device 100 (or bracket) of the type often used on electric power poles, the distribution device with two connector points and mounted on fiberglass shaft 140 by wide portion 840. FIG. 25 is top view of power distribution device 100 of FIG. 24.

Figure 26:
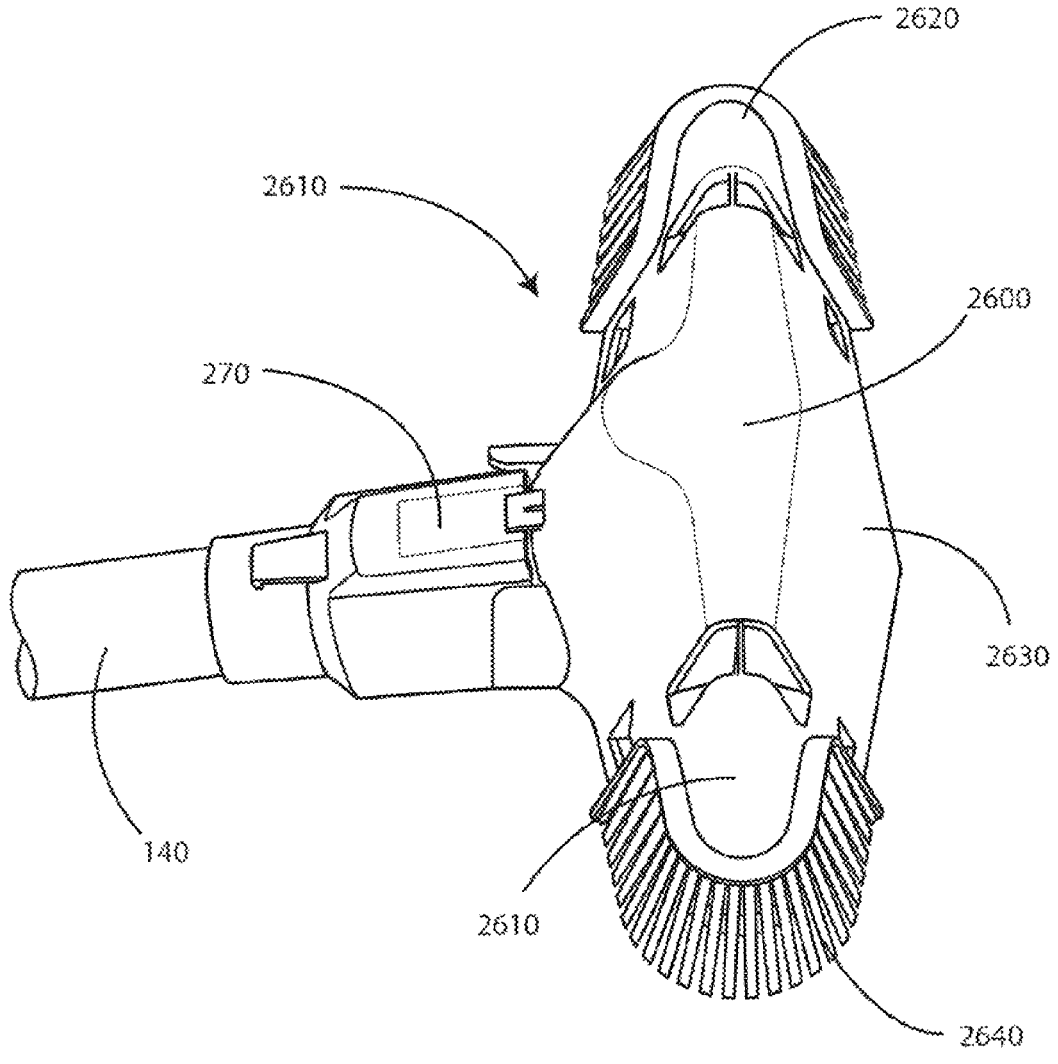
FIG. 26 is a perspective view of a protective cover of made in accordance with the present disclosure, installed on a multi-connector power distribution device.
Figure 27:
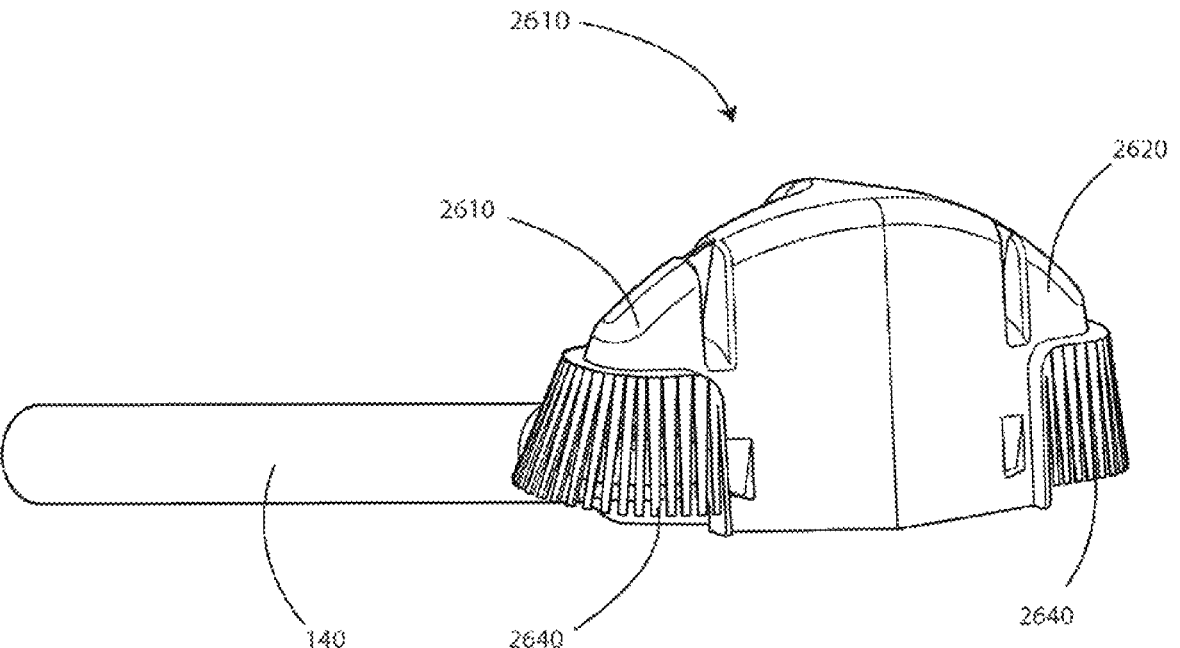
FIG. 27 is a front perspective view of a protective cover of made in accordance with the present disclosure, installed on a multi-connector power distribution device.
Figure 28:
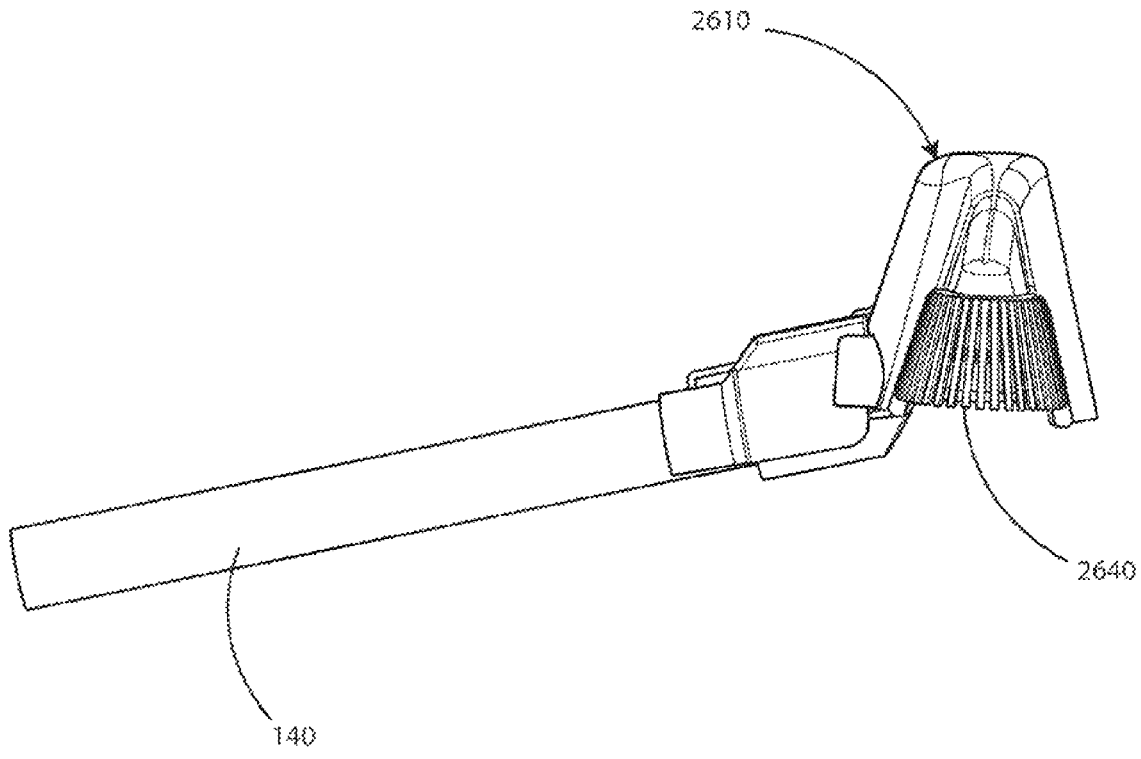
FIG. 28 is a side view of a protective cover of made in accordance with the present disclosure, installed on a multi-connector power distribution device.

FIG. 26 is a perspective view of a protective cover 2600 of made in accordance with the present disclosure and mounted on shaft 140 by wide portion 840, installed on a multi-connector power distribution device. FIG. 27 is a front perspective view of a protective cover of made in accordance with the present disclosure, installed on a multi-connector power distribution device. The protective cover 2600 includes first lobe 2610 and second lobe 2620, along with central area 2630 without a lobe. Bristles 2640 prevent animals and insects from entering beneath the protective cover while also allowing conductors to extend out. FIG. 28 is a side view of a protective cover 2600 of made in accordance with the present disclosure, installed on a multi-connector power distribution device.

In an embodiment, a protective cover for a multi-connector power distribution device, the protective cover is included having at least two substantially concave coverage lobes, each of the coverage lobes corresponding to a connector on the multi-connector power distribution device.

In an embodiment, the protective cover includes at least three coverage lobes.

In an embodiment, the protective cover is electrically non-conductive.

In an embodiment, the lobes further can include a relief cut.

In an embodiment, the lobes further include a snap clip for securing to the power distribution device.

In an embodiment, further can include two snap clips on opposed sides of the protective cover.

In an embodiment, further can include an internal stop retaining the protective cover at a defined height above the power distribution device.

In an embodiment, the concave coverage lobes are rounded.

In an embodiment, further can include interior shields restricting insect entry into central portions of the multi-connector power distribution device.

In an embodiment, the interior shields isolate the central portions of the multi-connector power distribution device.

In an embodiment, wherein when installed the protective cover has a gap near outer lobes that allows for a conductor to extend out.

In an embodiment, wherein when installed the gap is at least 270 degrees around.

In an embodiment, wherein when installed the gap is at least 180 degrees around.

In an embodiment, wherein when installed the gap is at least 120 degrees around.

In an embodiment, the protective cover has brushes for restricting entry of small animals and insects.

In an embodiment, the brushes are integrated into the protective cover.

In an embodiment, the gap is at least 0.25 inches in height.

In an embodiment, the gap is at least 0.5 inches in height.

In an embodiment, the gap is at least 0.75 inches in height.

In an embodiment, the protective cover further can include a neck element.

In an embodiment, the neck element is rounded.

In an embodiment, the neck element connected to the remainder of the protective cover by a clip.

In an embodiment, the neck element having a fastener slot.

In an embodiment, the fastener is configured to receive a clip tie.

In an embodiment, the neck element has two interior diameters.

In an embodiment, the neck element fits over a collar on the main piece.

In an embodiment, a protective cover for a multi-connector power distribution device, the protective cover is included having at least three substantially coverage lobes, each of the coverage lobes corresponding to a connector on the multi-connector power distribution device, and further can include interior shields restricting insect entry into central portions of the multi-connector power distribution device, further can include an internal stop retaining the protective cover at a defined height above the power distribution device.

In an embodiment, the protective cover includes at least three coverage lobes.

In an embodiment, the protective cover is electrically non-conductive.

In an embodiment, the lobes further can include a relief cut.

In an embodiment, the lobes further include a snap clip for securing to the power distribution device.

In an embodiment, further can include two snap clips on opposed sides of the protective cover.

In an embodiment, further can include an internal stop retaining the protective cover at a defined height above the power distribution device.

In an embodiment, the concave coverage lobes are rounded.

In an embodiment, further can include interior shields restricting insect entry into central portions of the multi-connector power distribution device.

In an embodiment, the interior shields isolate the central portions of the multi-connector power distribution device.

In an embodiment, wherein when installed the protective cover has a gap near outer lobes that allows for a conductor to extend out.

In an embodiment, wherein when installed the gap is at least 270 degrees around.

In an embodiment, wherein when installed the gap is at least 180 degrees around.

In an embodiment, wherein when installed the gap is at least 120 degrees around.

In an embodiment, the protective cover has brushes for restricting entry of small animals and insects.

In an embodiment, the brushes are integrated into the protective cover.

In an embodiment, the gap is at least 0.25 inches in height.

In an embodiment, the gap is at least 0.5 inches in height.

In an embodiment, the gap is at least 0.75 inches in height.

In an embodiment, the protective cover further can include a neck element.

In an embodiment, the neck element is rounded.

In an embodiment, the neck element connected to the remainder of the protective cover by a clip.

In an embodiment, the neck element having a fastener slot.

In an embodiment, the fastener is configured to receive a clip tie.

In an embodiment, the neck element has two interior diameters.

In an embodiment, a protective cover for a multi-connector power distribution device, the protective cover is included having at least three substantially coverage lobes, each of the coverage lobes corresponding to a connector on the multi-connector power distribution device, and further can include interior shields restricting insect entry into central portions of the multi-connector power distribution device, further can include an internal stop retaining the protective cover at a defined height above the power distribution device, wherein the protective cover is electrically non-conductive, wherein the lobes further can include a relief cut, and wherein the lobes further include a snap clip for securing to the power distribution device.

In an embodiment, further can include two snap clips on opposed sides of the protective cover.

In an embodiment, further can include an internal stop retaining the protective cover at a defined height above the power distribution device.

In an embodiment, the concave coverage lobes are rounded.

In an embodiment, further can include interior shields restricting insect entry into central portions of the multi-connector power distribution device.

In an embodiment, the interior shields isolate the central portions of the multi-connector power distribution device.

In an embodiment, wherein when installed the protective cover has a gap near outer lobes that allows for a conductor to extend out.

In an embodiment, wherein when installed the gap is at least 270 degrees around.

In an embodiment, wherein when installed the gap is at least 180 degrees around.

In an embodiment, wherein when installed the gap is at least 120 degrees around.

In an embodiment, the protective cover has brushes for restricting entry of small animals and insects.

In an embodiment, the brushes are integrated into the protective cover.

In an embodiment, the gap is at least 0.25 inches in height.

In an embodiment, the gap is at least 0.5 inches in height.

In an embodiment, the gap is at least 0.75 inches in height.

In an embodiment, the protective cover further can include a neck element.

In an embodiment, the neck element is rounded.

In an embodiment, the neck element connected to the remainder of the protective cover by a clip.

In an embodiment, the neck element having a fastener slot.

In an embodiment, the fastener is configured to receive a clip tie.

In an embodiment, the neck element has two interior diameters.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration.

The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A protective cover for a multi-connector power distribution device, the protective cover comprising:

at least two substantially concave coverage lobes, each of the coverage lobes corresponding to a connector on the multi-connector power distribution device;

further comprising interior shields restricting insect entry into central portions of the multi-connector power distribution device.

2. The protective cover for the multi-connector power distribution device of claim 1, wherein the protective cover comprises at least three coverage lobes.

3. The protective cover for the multi-connector power distribution device of claim 1, wherein the lobes further comprising a relief cut.

4. The protective cover for the multi-connector power distribution device of claim 1, further comprising an internal stop retaining the protective cover at a defined height above the power distribution device.

5. The protective cover for the multi-connector power distribution device of claim 1, wherein the interior shields isolate the central portions of the multi-connector power distribution device.

6. The protective cover for the multi-connector power distribution device of claim 1, wherein when installed the protective cover has a gap near outer lobes that allows for a conductor to extend out.

7. The protective cover for the multi-connector power distribution device of claim 6, wherein when installed the gap is at least 270 degrees around.

8. The protective cover for the multi-connector power distribution device of claim 1, wherein the protective cover further comprising a neck element.

9. The protective cover for the multi-connector power distribution device of claim 8, wherein the neck element having a fastener slot.

10. A protective cover for a multi-connector power distribution device, the protective cover comprising:

at least three substantially coverage lobes, each of the coverage lobes corresponding to a connector on the multi-connector power distribution device; and further comprising interior shields restricting insect entry into central portions of the multi-connector power distribution device; further comprising an internal stop retaining the protective cover at a defined height above the power distribution device.

11. The protective cover for the multi-connector power distribution device of claim 10, wherein the protective cover comprises at least three coverage lobes.

12. The protective cover for the multi-connector power distribution device of claim 10, wherein the lobes further comprising a relief cut.

13. The protective cover for the multi-connector power distribution device of claim 10, further comprising an internal stop retaining the protective cover at a defined height above the power distribution device.

14. The protective cover for the multi-connector power distribution device of claim 10, wherein the protective cover further comprising a neck element.

15. The protective cover for the multi-connector power distribution device of claim 14, wherein the neck element is connected to the remainder of the protective cover by a clip.

16. A protective cover for a multi-connector power distribution device, the protective cover comprising:

at least three substantially coverage lobes, each of the coverage lobes corresponding to a connector on the multi-connector power distribution device; and further comprising interior shields restricting insect entry into central portions of the multi-connector power distribution device; further comprising an internal stop retaining the protective cover at a defined height above the power distribution device;

wherein the protective cover is electrically non-conductive;

wherein the lobes further comprising a relief cut;

and wherein the lobes further comprise a snap clip for securing to the power distribution device.

17. The protective cover for the multi-connector power distribution device of claim 16, further comprising an internal stop retaining the protective cover at a defined height above the power distribution device.

18. The protective cover for the multi-connector power distribution device of claim 16, further comprising interior shields restricting insect entry into central portions of the multi-connector power distribution device.

19. The protective cover for the multi-connector power distribution device of claim 18, wherein the interior shields isolate the central portions of the multi-connector power distribution device.

\*    \*    \*    \*    \*